(12) United States Patent  
Denne

(10) Patent No.: US 8,232,689 B2
(45) Date of Patent: Jul. 31, 2012

(54) ELECTROMAGNETIC MACHINES

(75) Inventor: Phillip Raymond Michael Denne, Bournemouth (GB)

(73) Assignee: Guilden Limited, Bournemouth, Dorset (GB)

( * ) Notice: Subject to any disclaimer, the term of this patent is extended or adjusted under 35 U.S.C. 154(b) by 657 days.

(21) Appl. No.: 12/438,709

(22) PCT Filed: Sep. 12, 2007

(86) PCT No.: PCT/GB2007/003482
§ 371 (c)(1),
(2), (4) Date: Aug. 13, 2009

(87) PCT Pub. No.: WO2008/032080
PCT Pub. Date: Mar. 20, 2008

(65) Prior Publication Data
US 2010/0007223 A1    Jan. 14, 2010

(30) Foreign Application Priority Data
Sep. 13, 2006 (GB) .................................. 0617989.9

(51) Int. Cl.
H02K 41/02 (2006.01)
H02K 1/00 (2006.01)
(52) U.S. Cl. ............... 310/12.22; 310/12.21; 310/12.23; 310/12.24; 310/179
(58) Field of Classification Search ............... 310/12.21, 310/12.22, 12.23, 12.24, 179
See application file for complete search history.

(56) References Cited

U.S. PATENT DOCUMENTS

| | | | |
|---|---|---|---|
| 3,668,452 A | | 6/1972 | Hu |
| 3,806,782 A | * | 4/1974 | Matsui et al. ............... 104/282 |
| 3,913,045 A | | 10/1975 | Starck |
| 3,924,537 A | * | 12/1975 | Matsui et al. ............... 104/282 |
| 4,068,143 A | | 1/1978 | Whiteley |
| 4,151,447 A | | 4/1979 | von der Heide et al. |
| 4,319,152 A | | 3/1982 | van Gils |
| 4,561,175 A | | 12/1985 | Kawasumi |
| 4,584,513 A | | 4/1986 | Freise et al. |
| 4,749,921 A | | 6/1988 | Chitayat |
| 5,656,901 A | | 8/1997 | Kurita |
| 6,040,650 A | | 3/2000 | Rao |
| 6,140,734 A | * | 10/2000 | Hazelton et al. ........... 310/12.22 |
| 2006/0244324 A1 | | 11/2006 | Graham et al. |

FOREIGN PATENT DOCUMENTS

| | | |
|---|---|---|
| DE | 4130519 A1 | 3/1993 |
| DE | 19847813 A1 | 4/2000 |
| EP | 0374805 A2 | 6/1990 |
| EP | 0949749 A1 | 10/1999 |
| EP | 1168084 A2 | 1/2002 |
| GB | 982388 | 2/1965 |
| GB | 2012495 A | 7/1979 |
| GB | 1589582 | 5/1981 |

(Continued)

*Primary Examiner* — Quyen Leung
*Assistant Examiner* — Jose Gonzalez Quinones
(74) *Attorney, Agent, or Firm* — Haverstock & Owens LLP

(57) ABSTRACT

An electromagnetic machine (1) comprises an electrical conductor vane (7) disposed between two magnetic arrays (3). The electrical conductor vane (7) comprises a plurality of electrically insulated conductors (35), wherein when the conductors (35) are disposed in magnetic fields produced by the magnetic arrays (3) and when current flows in the conductors (35), an electromagnetic force is induced to cause movement of the magnetic arrays (3) relative to the electrical conductor vane (7) and wherein the set of conductors (35) substantially fills the gap between the magnetic arrays (3) through which the magnetic fields pass.

25 Claims, 18 Drawing Sheets

FOREIGN PATENT DOCUMENTS

| | | | |
|---|---|---|---|
| GB | 2295279 A | 5/1996 | |
| GB | 2343997 A | 5/2000 | |
| JP | 61170267 | 7/1986 | |
| JP | 61295840 A | * 12/1986 | |
| JP | 62189931 | 8/1987 | |
| JP | 62239852 | 10/1987 | |
| JP | P2000-188855 A | 7/2000 | |
| JP | P2003-219626 A | 7/2003 | |
| WO | 9637036 | 11/1996 | |
| WO | 9744880 | 11/1997 | |
| WO | 2004075382 A2 | 9/2004 | |

* cited by examiner

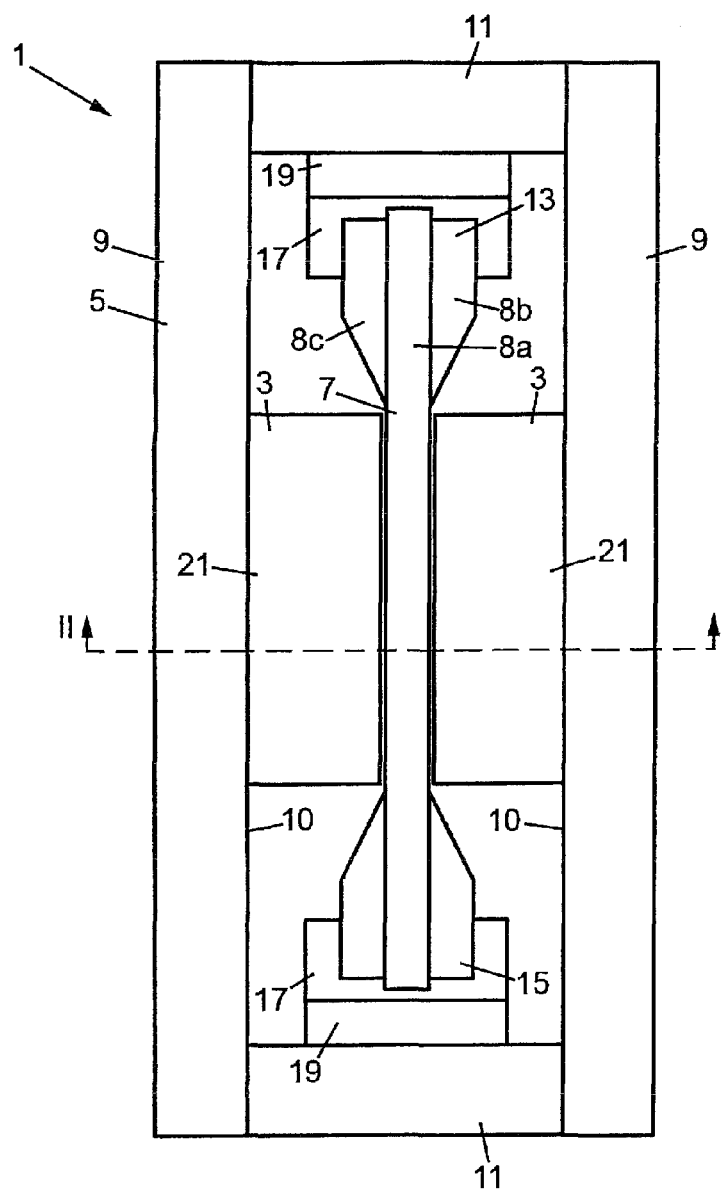
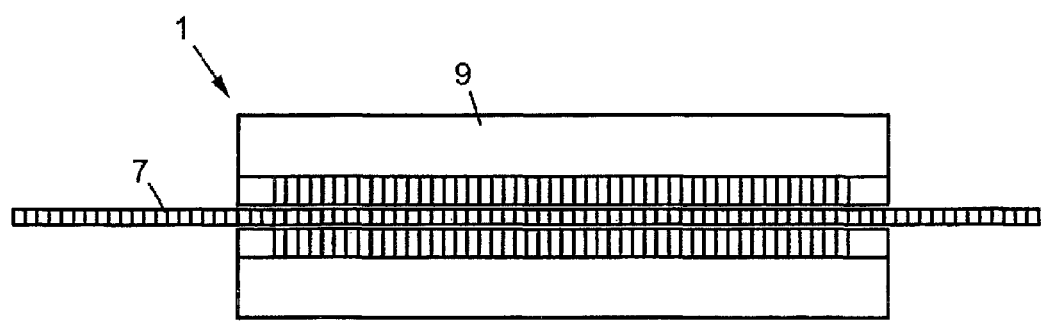
Fig. 1
Fig. 2

ELECTROMAGNETIC MACHINES

The present invention relates to electromagnetic machines such as linear motors and rotary motors.

Conventional electromagnetic machines are designed to produce a force by the mutual interaction of magnetic field patterns produced by both the armature and the stator, at least one of the magnetic field patterns being electrically varied, and these machines are herein referred to as "inter-magnetic" machines.

In conventional "inter-magnetic" machines the electrical part of the machine consists of coils of wire that are wound in slots of an iron structure. The iron structure holds the coils in position and provides the mechanical strength necessary to transfer the electromagnetic forces on the wires to the body of the machine—and it also serves as a path of low reluctance for the magnetic flux.

"Inter-magnetic" machines are constructed so that the area enclosed by a looped conductor (or an equivalent bundle of conductors) is matched to that of the magnetic pole pieces or is a coarse fraction thereof (i.e., the area enclosed by a low integer number of looped conductors matches the area of the magnetic pole pieces). In addition in "inter-magnetic" machines the frontal area of the coil is relatively small and the coil often encloses a volume of high-permeability magnetic material whose function is to reduce the air gap distance of the magnetic circuit and to provide a rigid support on which the coil is wound. To make the coils surround the iron, the coils of an "inter-magnetic" machine are usually placed in slots cut into the iron—the coils themselves are not in the air gap and the air gap distance is small.

It is known to construct linear electric motors in cylindrical form in which the output is a rod or tube, or in planar form in which the armature moves upon the surface of the stator or in a channel between two similar stators. It is also known to construct such machines with an armature that is not connected externally but used as a piston for compression, for controlled expansion (the motor being driven in reverse and acting as a generator) or as an inertial mass, the reaction forces being coupled to the load via the stator.

In either topology, the magnetic part generally consists of an array of permanent magnets that produces a spatially-periodic magnetic field transverse the locus of relative motion. The electrical part of a linear motor consists of at least one array of coils or electrical conductors intersecting the said spatially-periodic magnetic field in a direction orthogonal to both the locus of motion and to the magnetic field.

The iron structure holding the coils in position results in the electrical conductors being effectively immersed in the iron. An important result of using that topology is that the effective flux density experienced by the wire is limited by the practical geometry of the slots in the iron structure and by the permeability of the iron, so that the wire behaves as though it intersects a magnetic field whose working flux density is generally in the order of 0.6 Tesla.

It is desirable to operate an electromagnetic machine with a high flux density in the region of the coils, so as to reduce the current required for any given output force or torque. That is because the force P (in Newtons) produced by an electromagnetic machine is the vector cross product of the magnetic field strength B (in Tesla), the length of the electrical current path L (in meters) and the strength of that current I (in Amperes). Further, since the resistive heat loss (commonly called "copper loss") increases with the square of the current, it is especially desirable to use a high working flux density in machines that are required to produce a high-thrust output, so as to minimise the copper loss.

In this application we describe means by which the magnetic flux density in which the conductors are immersed may be increased to around 1.5 Tesla, at which point it begins to be limited by the saturation of readily-available magnetic materials such as mild steel. By the use of special magnetic materials the field strength may be further increased.

The increased magnetic field strength has the disadvantage that it causes larger internal forces within the machine, because the force F (Newtons) between two plane magnetic surfaces having an area A (sq m) and linked by magnetic flux having a density B (Tesla) increases with the square of the flux density linking those surfaces and is given approximately by $$F=400,000B^2A$$

That is to say, the field produces an effective "magnetic pressure" forcing the two surfaces together, whose value in Bar is equal to $4B^2$.

For example, if a flux density of 1.5 Tesla emerges from a pole piece 5 mm wide and 100 mm long, the pole piece is constantly attracted to an adjacent flux-return plate by a force of 450 Newtons. A typical armature with 50 such pole pieces will produce a large magnetostatic force of 22,500 Newtons. If the electrical efficiency of the machine is improved by the use of special magnetic materials and the flux density is increased to 2 Tesla, the magnetostatic force produced by an armature of the same size will increase to 40,000 Newtons.

Many conventional linear motors are designed in such a way that they consist of an armature with a stator on one side only, the armature being held clear of the stator by a bearing system. Any proposed increase in flux density between the two parts is discouraged because the full magnetostatic force has to be resisted by the armature bearings.

The topology of an industrial linear motor is often modified so that the electrical armature travels along the centre line of a parallel-sided channel lined with magnets, so that it experiences approximately equal forces of attraction to the opposite sides of the stator channel. Nevertheless, it will be understood that any imbalance between those opposing forces will have to be resisted by the bearings that centralise the armature position. As the flux density is increased, the magnitude of those opposing forces increases rapidly and the effect of any imbalance is also greater. Thus the armature bearings of a conventional linear motor must be made more robust if the flux density is to be increased.

The characteristics of even the best available magnetic materials are such that the optimum working flux density at the surface of a permanent magnet (the condition of BH maximum) is only a fraction of a Tesla. Thus, if the flux density in the gap between the armature and the stator is to be increased to more than one Tesla, it is necessary to use pole pieces that concentrate the flux from the magnet surface into a much smaller area. The flux density is then multiplied by the area ratio, providing that the pole piece material does not saturate magnetically.

In some of the present applicant's previous applications relating to cylindrical machines the magnets are plane flat discs magnetised between parallel surfaces. In such designs, an iron pole piece of similar form is fitted on either side of the magnet, so that the pole pieces are the "bread" of a circular sandwich with the magnet in the middle, which together are referred to as a "magnetic force unit". The function of the pole pieces is to concentrate the flux from the plane faces of the magnet and to divert it radially so that it emerges from the cylindrical periphery of the pole pieces.

In the machines described in this application, the magnets and pole pieces are flat plates and the flux is arranged to emerge (at increased concentration) from two opposite planar sides. In three-phase machines the pole pieces and the magnets have the same thickness—and that dimension is also the spacing between the coils along the axis of motion. So if it is necessary to decrease the axial thickness of the pole piece so as to further concentrate the flux, the magnet thickness and the dimensions of the electrical conductors must also decrease. Thus a machine having a high flux density has more magnetic poles (of alternating polarity) per unit length of its line of motion. For any given speed of travel of the armature relative to the stator, the frequency of flux alternations increases with design flux density.

Iron associated with the electrical conductors is commonly called "backing iron" and the amplitude and direction of the magnetic flux in the iron alternates as the armature moves relative to the stator. That alternation of field direction causes energy to be dissipated in the iron—and the "iron loss" increases as the square of the flux density.

For all of the above reasons, electrical machines of high working flux density are not commonly available and they are restricted to specialist applications for which the corresponding disadvantages can be accepted.

U.S. Pat. No. 4,319,152 describes the use of patterned metal laminations in place of wound coils in rotary electrical machines. However the use of laminar conductors is only described as being used for the energisation of electromagnets and as a simple and direct replacement for wire that could have been used for the same function. It is also to be noted that FIG. 3 of U.S. Pat. No. 4,319,152 shows two forms of a slotted iron or ferrite core, into which the metal laminations are intended to be placed—there is no intention that the backing iron is to be eliminated, nor that the laminated conductors should be self-supporting.

GB-A-1420391 describes the construction of a coil system to produce magnetic fields for the levitation of specialised railway vehicles. By the use of at least one other set of coils, the magnetic fields can be commutated so as to produce a differential force causing forward motion of the railway vehicles.

JP-A-62189931 describes a number of methods of constructing an electrical component of a rotary motor using a ribbon conductor.

It is known to use a stack of circular flat disc permanent magnets and pole pieces to construct an axially-alternating magnetic field having a high radial flux density. However, such cylindrical prior art structures are strongly limited as to the maximum axial force that they are capable of producing continuously because:—

1. The thrust of the magnetic piston is proportional to its volume or mass—directly to its length and to the square of its diameter.
2. There is, in any application, a practical limit to the piston length of a cylindrical actuator and it is therefore necessary to increase the disc diameter if greater thrust is required in a limited space. But there is also a limit to the maximum diameter of a one-piece magnet disc that is set by the practical difficulties of its manufacture as a sintered component.
3. There is a similar limit to the volume of a one-piece magnet that is set by the power required for its energisation by a pulsed magnetic field.
4. As the unit size of a powerful permanent magnet is increased, it becomes more dangerous to handle during the process of building the motor.
5. If it is essential to use a large-diameter disc magnet, there is no alternative but to assemble the large circular disc from many smaller segmental magnets, which must first be magnetised and then brought together (against strong mutual repulsion) before being bonded to an iron pole piece. Such an assembly process is both difficult and dangerous.
6. The magnetic remanence is decreased along the line of each junction between the segments (an effect called "fringing") so that a smaller amount of magnetic flux is available from an assembled magnet than from the equivalent one-piece component
7. In a cylindrical linear actuator of conventional construction all the coils forming the phase windings must be constructed individually, assembled as a stack and wired together with the correct phasing, then bonded to each other, to an internal lining that forms the bearing surface for the piston and finally to the thick outer casing that forms the backing iron of the machine. That manufacturing process is labour-intensive, its quality is difficult to control and it is costly.

Nevertheless, there is a demand for larger and more powerful cylindrical linear actuators than those that can be constructed according to the prior art. For that reason we have developed a range of high-power electrical machines that are efficient, relatively low in cost and safe to manufacture. The novel motors are assembled from a number of elemental machines, whose construction and operating principles are described below.

It is an object of this invention to provide a means of constructing an electrical machine in which the electrical conductors are placed in a high-flux density magnetic field, thus minimising the "copper loss".

It is a further object of this invention to reduce the amount of backing iron of the electrical conductors so that the "iron loss" is reduced.

It is a further object of this invention to reduce magnetic attraction between the armature and the stator, thereby reducing bearing wear and making assembly safer and less costly It is a further object of this invention to minimise the mass of a moving electrical armature so as to increase the operating bandwidth of the machine.

It is a further object of this invention to incorporate the basic linear motor element described herein in electromagnetic machines having a range of topologies.

It is a further object of this invention to show means by which many such motor elements may be combined to form a range of compact high-power electrical machines, both linear and rotary.

According to a first aspect of the invention there is provided an electromagnetic machine comprising: a magnetic part comprising a first portion and a second portion disposed in spaced relationship to the first portion, the magnetic part being arranged to provide a plurality of magnetic fields across a gap between the first portion and the second portion; and an electrical part disposed in the gap between the first and second portions of the magnetic part and arranged to move relative to the magnetic part, the electrical part consisting of a set of electrically insulated conductors, wherein when the set of conductors is disposed in a magnetic field produced by the magnetic part and when current flows in the set of conductors, an electromagnetic force is induced to cause movement of the magnetic part relative to the electrical part and wherein the set of conductors substantially fills the gap between the first and second portions of the magnetic part through which said magnetic field passes.

The electrical part may comprise further sets of electrically insulated conductors arranged along a locus of the relative motion of the magnetic and electrical parts, wherein sets of conductors substantially fill the gap between the first and second portions of the magnetic part through which said magnetic fields pass.

Whereas prior art electromagnetic machines are of the "inter-magnetic" type, this invention relates to electromagnetic machines having distinct electrical and magnetic parts. In such machines the motor force is not "inter-magnetic" but results from the action of the magnetic fields produced by the magnetic part upon moving electrical charges in conductors of the electrical part. It will also be understood that when driven as a generator, relative motion of the parts causes current to flow in the conductors.

Whereas "Inter-magnetic" machines are constructed so that the area enclosed by a looped conductor (or an equivalent bundle of conductors) is matched to that of the magnetic pole pieces or is a coarse fraction thereof, in contrast, in electromagnetic machines forming embodiments of this invention the area dimensions of the electrical conductors (or bundle of elemental conductors) themselves match those of the magnetic pole pieces, or are a coarse fraction thereof.

Whereas in "inter-magnetic" machines the frontal area of the coil is relatively small, in contrast, in electromagnetic machines forming embodiments of this invention the electrical conductors have a large frontal area and they are placed directly in the air gap between the magnetic pole pieces or in the air gap between the magnetic pole pieces and the high-permeability magnetic material or "backing iron". It is not necessary for the conductors of an electromagnetic machine forming an embodiment of this invention to form complete loops or coils The modus operandi of "inter-magnetic" machined differs to the modus operandi of the electromagnetic machines of the present invention because machines that are designed to operate by the mutual interaction of magnetic fields may be physically distinguished from those that are designed to operate electromagnetically.

Machines embodying this invention do not require wire coils in the electrical part hence such machines may be referred to as "wireless" motors. The electric currents instead flow in two-dimensional electrical conductors, which are not immersed in an iron flux conductor but are positioned in a magnetic field of high flux density. The electrical machines herein described benefit from improved efficiency and are capable of producing large forces and of operating at high power levels.

The conductors may be transverse conducting paths lying perpendicular to both said magnetic field and the direction of relative motion of the electrical and magnetic parts.

The transverse conducting paths may form a part of one or more laminar electrical conductor having a repeating 'S'-shape, the or each laminar electrical conductor further comprising axial conducting paths lying in the direction of relative motion of the electrical and magnetic parts wherein ends of adjacent transverse conducting paths are connected by an axial conducting path.

The laminar electrical conductor may be made from insulated patterned metallic sheet, strip, ribbon or foil.

A plurality of laminar electrical conductors may be interdigitated to form an electrical conductor vane.

The laminar electrical conductors may be connected in a plurality of phases through which separate electrical currents are arranged to pass, the relative signs and amplitudes of the currents being controlled so as to determine the magnitude and sign of the electromagnetic force produced by the machine.

Preferably the electrically insulated conductors are not shaped as coils. The electrical part disposed in the magnetic fields may be made of a non-magnetic material.

The laminar electrical conductor may be connected in three phases.

The electrical conductor vane may be a planar mechanical structure or a curved mechanical structure, including a circular mechanical structure.

The conductors may have no substrate and have sufficient flexural rigidity to be self-supporting.

The polarity of the magnetic fields may be spatially periodic along the locus of relative motion of the magnetic and electrical parts.

The first portion of the magnetic part may comprise a first magnetic array comprising magnets made of permanently magnetised material.

The magnets may be planar magnets having opposed poles on their planar faces which face the direction of relative motion of the electrical and magnetic parts, the magnetic array further comprising shaped pole pieces mounted on the planar faces of the magnets, the pole pieces being shaped to turn the magnetic flux so that it crosses the gap between the first and second portions of the magnetic part.

The second portion of the magnetic part may comprise a plate of magnetic material such as iron.

The second portion of the magnetic part may comprise a second magnetic array similar to the first magnetic array. The magnets and pole pieces may be arranged in each magnetic array such that opposed planar faces of adjacent magnets in each magnetic array have the same polarity and such that aligned planar faces of opposed magnets in different arrays have opposite polarity.

The spatially-periodic magnetic fields may be produced by means of wire coils or by patterned laminar conductors through which electric currents are caused to flow when the machine is in operation.

The spatially-periodic magnetic fields may be induced by temporal variation of the currents in the conductors of the electrical part.

The laminar electrical conductors may have a regular spatial dimension that is approximately equal to but less than one sixth of the length of the magnetic period and which causes the current to flow alternately back and forth transverse to the line of the force vector with a spatial period equal to one half of the magnetic period, the conducting paths of each phase being arranged to lie adjacent those of the other two phases in the region of the spatially-periodic magnetic field and to overlap them elsewhere.

The electrical part may be mounted in one or more cap beam having a low thermal resistance, the or each cap beam comprising means for dissipating heat generated in the electrical part. The means for dissipating heat generated in the electrical part may comprise one or more of a coolant channel within the cap beams through cooling fluid can flow, a heat sink and a heat dissipator.

The magnetic part may forms an armature and the electrical part forms a stator or the magnetic part may form a stator and the electrical part may form an armature.

The armature may be slidably or pivotally mounted on the stator by means of one or more bearing.

The armature force-carrying element may emerge from or be carried by the stator bearing assembly.

At least one end of the machine may have an aperture and carry a cylindrical bearing through which is extended a thrust tube or rod by which the force on the armature may be transmitted externally.

The armature may external to the stator, the armature being coupled to the load.

The electric currents of the electrical part may interact with a plurality of magnetic parts travelling along at least one bearing or track coincident with or parallel to locus of relative motion of the electrical and magnetic parts.

The electrical part may be divided into sectors along the locus of relative motion of the electrical and magnetic parts, each of the sectors being independently powered and controlled so as to provide independent control of a plurality of magnetic parts sharing the sectors of the electrical part.

There may be no fin or rod extended so as to connect to an internal armature but in which the load is connected to a stator and thereby receive the whole or part of the reaction forces corresponding with the accelerations of the unconnected armature.

The locus of relative motion of the magnetic and electrical parts may comprise one or both of straight sections and curved sections and the locus may form a closed circular path.

The armature may mechanically connected to at least one disc or wheel by which the rotational torque produced by the electromagnetic forces on the armature may be conveyed to a shaft whose axis is coincident with the central axis of the torus formed by the stator.

The locus of relative motion of the magnetic and electrical parts may form a smooth curve in three dimensions, such as a spiral.

The armature assembly may flexible or articulated and follow a smooth locus of motion in three dimensions.

At least one of the conductors may include or support a layer of material which, when cooled below its critical temperature, becomes superconducting.

At least one of the conductors may be fabricated from ferromagnetic material.

According to a second aspect of the invention there is provided an electromagnetic machine comprising first and second magnetic arrays disposed in spaced relationship and arranged to provide a plurality of magnetic fields across a gap between the magnetic arrays; and an electrical conductor vane disposed in the gap between the magnetic arrays, the electrical conductor vane comprising a plurality of closely packed self-supporting actuating conductors and a plurality of connector conductors, each actuating conductor being connected at one of its ends to an end of another actuating conductor by means of a connecting conductor; the electrical conductor vane being arranged such that when current flows in the actuating conductors an electromagnetic force is induced to cause movement of the electrical conductor vane relative to the magnetic arrays and wherein the actuating conductors are disposed in the line of sight between magnetic arrays and the connecting conductors are arranged outside the line of sight between the magnetic arrays.

According to a first aspect of the invention there is provided a rotary electromagnetic machine comprising: a cylindrical electrical conductor vane, the electrical conductor vane comprising a plurality of substantially axially parallel actuating conductors and a plurality of connecting conductors, each actuating conductor being connected at one of its ends to an end of another actuating conductor by means of a connecting conductor; and a plurality of magnetic arrays arranged to provide a plurality of magnetic fields through the actuating conductors such that when current flows in the actuating conductors an electromagnetic force is induced to cause radial movement of the electrical conductor vanes relative to the magnetic arrays.

The magnetic arrays may comprise an inner cylindrical magnetic array disposed on the inside of the cylindrical conductor vane and an outer cylindrical magnetic array disposed on the outside of the cylindrical conductor vane.

According to a further aspect of the invention there is provided a rotary electromagnetic machine comprising an annular electrical conductor vane, the electrical conductor vane comprising a plurality of substantially radial actuating conductors and a plurality of connecting conductors, each actuating conductor being connected at one of its ends to an end of another actuating conductor by means of a connecting conductor; and a plurality of magnetic arrays arranged to provide a plurality of magnetic fields through the actuating conductors such that when current flows in the actuating conductors an electromagnetic force is induced to cause rotation of the electrical conductor vane relative to the magnetic arrays.

According to a further aspect of the invention there is provided a rotary electromagnetic machine comprising: a plurality of annular electrical conductor vanes having a common axis, each electrical conductor vane comprising a plurality of substantially radial actuating conductors and a plurality of connecting conductors, each actuating conductor being connected at one of its ends to an end of another actuating conductor by means of a connecting conductor; and a plurality of magnetic arrays arranged to provide a plurality of magnetic fields through the actuating conductors such that when current flows in the actuating conductors an electromagnetic force is induced to cause rotation of the electrical conductor vanes relative to the magnetic arrays.

At least one of the annular electrical conductor vanes may have an associated magnetic array in common with at least one of its neighbouring annular electrical conductor vanes.

According to a further aspect of the invention there is provided a linear electromagnetic machine comprising: a plurality of electrical conductor vanes, each electrical conductor vane comprising a plurality of actuating conductors and a plurality of connecting conductors, each actuating conductor being connected at one of its ends to an end of another actuating conductor by means of a connecting conductor, the conductor vanes being disposed parallel to each other; and a plurality of magnetic arrays arranged to provide a plurality of magnetic fields through the actuating conductors such that when current flows in the actuating conductors an electromagnetic force is induced to cause movement of the electrical conductor vanes relative to the magnetic arrays.

According to a further aspect of the invention there is provided a linear electromagnetic machine comprising a plurality of electrical conductor vanes, each electrical conductor vane comprising a plurality of actuating conductors and a plurality of connecting conductors, each actuating conductor being connected at one of its ends to an end of another actuating conductor by means of a connecting conductor, the conductor vanes being arranged radially around a shaft; and a plurality of magnetic arrays arranged to provide a plurality of magnetic fields through the actuating conductors such that when current flows in the actuating conductors an electromagnetic force is induced to cause movement of the electrical conductor vanes relative to the magnetic arrays.

At least one of the electrical conductor vanes may have an associated magnetic array in common with at least one of its neighbouring electrical conductor vanes.

Each magnetic array may be comprised of an even number of magnets.

The machine may be configured within a cylindrical container. At least one end of the containing cylinder may have an aperture and carry a bearing through which a thrust tube or rod emerges so as to convey the induced electromagnetic force to an external load.

A volume that includes the containing cylinder may be hermetically sealed and the emerging thrust rod or tube may be arranged to pass through a sliding seal, so that the armature may have both an electrical and a pneumatic function.

The thrust rod or tube may form the active element of a gas spring.

The or each electrical conductor vane may be divided into electrically-isolated sectors along a locus of motion of the machine.

Impulsive electromagnetic forces on the armature may be transmitted to the load via the equal and opposite reaction forces experienced by the stator.

The movement of the armature may be arranged to propel or to be propelled by fluid within the enclosed stator, so as to function as a pump or to absorb energy from a moving fluid.

According to a further aspect of the invention there is provided an electromagnetic machine comprising: a magnetic part comprising a first portion and a second portion disposed in spaced relationship to the first portion, the magnetic part being arranged to provide a plurality of magnetic fields across a gap between the first portion and the second portion; and an electrical part disposed in the gap between the first and second portions of the magnetic part and arranged to move relative to the magnetic part, the electrical part consisting of a set of electrically-insulated self-supporting conductors, so that when current flows in the set of conductors, the resulting electromagnetic force causes relative motion between the two parts.

According to a further aspect of the invention there is provided an electrical conductor vane for an electromagnetic machine having a magnetic part for providing magnetic fields to the electrical conductor vane such that when current flows in the electrical conductor vane an electromagnetic force is induced to cause movement of the electrical conductor vane relative to the magnetic part, the electrical conductor vane comprising: a plurality of actuating conductors; and a plurality of connector conductors, each actuating conductor being connected at one of its ends to an end of another actuating conductor by means of a connecting conductor, the electromagnetic force being induced when the current flows in the actuating conductors, wherein central portions of the actuating conductors are closely packed and end portions of some of the actuating conductors are bent in the region of the connecting conductors so that the connecting conductors are overlaid.

The invention will be further described by way of example with reference to the accompanying drawings in which:

FIG. 1 is a schematic cross section of an elemental linear actuator which is an electromagnetic machine forming a first embodiment of the invention;

FIG. 2 is a schematic sectional view of the electromagnetic machine of FIG. 1 along line U-II of FIG. 1;

FIG. 1 is a schematic cross section of an elemental linear actuator 1 which is an electromagnetic machine forming a first embodiment of the invention, the section being taken along line I-I of FIG. 3.

Figure 3:
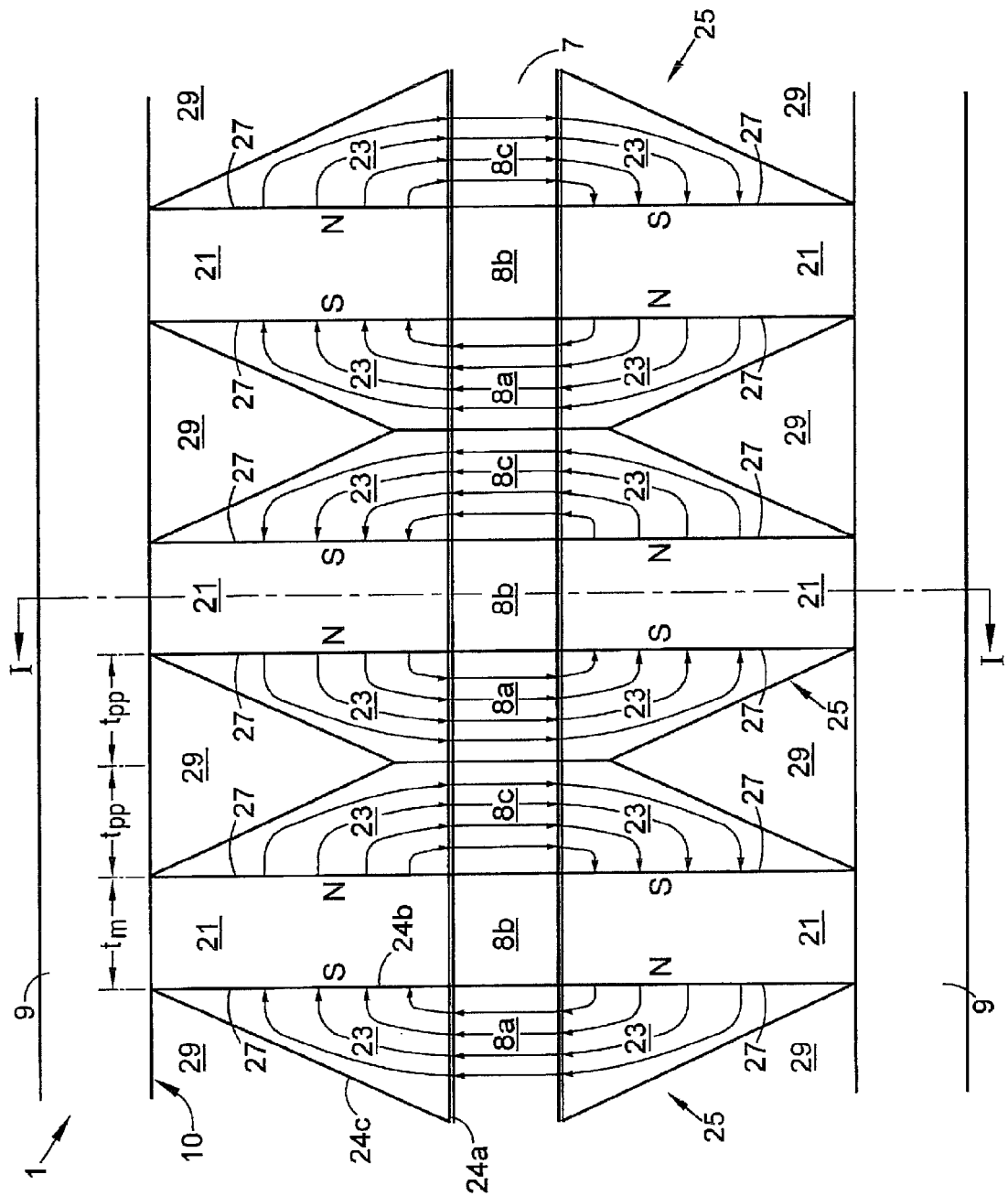
FIG. 3 is an enlarged view of part of FIG. 2.

The actuator 1 is comprised of a magnetic part comprising two opposed magnetic arrays 3 respectively forming first and second portions of the magnetic part. The magnetic arrays 3 are mounted in a housing 5 and an electrical part comprising an electrical conductor vane 7 is arranged to move axially within the housing 5 between the magnetic arrays 3, in and out of the page as shown in FIG. 1. In this embodiment the magnetic arrays 3 act as a stator and the electrical conductor vane 7 acts as an armature but in other embodiments the magnetic arrays 3 may act as the armature and the electrical conductor vane 7 may act as the stator. The housing 5 is made of a non-magnetic material and is comprised of a pair of side plates 9 respectively attached at their upper and lower ends to top and bottom plates 11 to form a rectangular frame when viewed from the end, as shown in FIG. 1.

The electrical conductor vane 7 is a three-phase vane conductor vane comprising three sets 8a, 8b, 8c of phase conductors; the structure of electrical conductor vane 7 is described in further detail below with reference to FIGS. 4 to 10. (Each set 8a, 8b, 8c of phase conductors is shown in FIGS. 1 to 3 as a single block for the sake of clarity.)

Each magnetic array 3 is mounted on an inner wall 10 of its associated side plate 9, one magnetic array 3 being in spaced relationship to the other magnetic array 3, and the electrical conductor vane 7 is disposed in the gap between the magnetic arrays 3. The magnetic arrays are disposed in close proximity to the electrical conductor vane 7 to minimise the air gap between these parts in order to optimise magnetic flux transfer between the magnetic arrays 3 and the electrical conductor vane 7, as is known in the art.

The upper 13 and lower 15 portions of the electrical conductor vane 7 are each held in a cap beam 17 extending along the length of the electrical conductor vane 7 (in and out of the page of FIG. 1). The cap beam 17 is slidably mounted to the top and bottom plates 11 by means of bearings 19 that allow the electrical conductor vane 7 to move relative to the magnetic part of the elemental linear actuator 1 along the housing 5 without touching the magnetic arrays 3.

FIGS. 2 and 3 are schematic sectional views of the elemental linear actuator 1 of FIG. 1 along line II-II of FIG. 1, FIG. 3 showing a portion of the actuator 1 in greater detail than shown in FIG. 2. The magnetic arrays 3 are comprised of a plurality of "magnetic force units" 25, each magnetic force unit 25 comprising a magnet 21 sandwiched between a pair of shaped pole pieces 23. The magnets 21 are planar magnets having opposed poles on their planar faces 27 and the shaped pole pieces 23 are attached to the planar faces 27 of the magnet 21.

The thickness $t_m$ (in the axial direction, along the length of the electrical conductor vane 7) of each magnet 21 is substantially the same as the thickness $t_{pp}$ of each pole piece 23 which also corresponds to the thickness of the sets 8a, 8b, 8c of phase conductors, as is explained below with reference to the width $w_{tcp}$ of the transverse conducting paths. The shaped pole pieces 23 have a right-angled trapezoidal shape when viewed from above with the perpendicular face 24a disposed distal to the side plate 9 of the housing 5 and the adjacent longest face 24b abutting the planar face 27 of a magnet 21. In this embodiment, the magnets 21 are made of permanently magnetised material but electromagnets may be used in other embodiments.

The magnets 21 and pole pieces 23 are arranged in each magnetic array 3 such that opposed planar faces 27 of adjacent magnets 21 have the same polarity, i.e., the north pole (N) on a planar face 27 of a magnet 21 faces the north pole (N) on a planar face 27 of an adjacent magnet 21. The pair of magnetic arrays 3 are arranged on the side plates 9 of the housing 5 on each side of the electrical conductor vane 7 such that aligned planar faces 27 of opposed magnets 21 have opposite polarity, i.e., the north pole (N) on a planar face 27 of a magnet 21 of one magnetic array 3 is aligned with the south pole (S) on the aligned planar face 27 of an opposed magnet 21 of the other magnetic array 3.

The effect of this arrangements of magnets 21 and shaped pole pieces 23 on each side of the electrical conductor vane 7 is to turn the magnetic flux which emanates perpendicularly out of the planar faces 27 of the magnets (parallel to the locus of relative motion) through a right angle and the pole pieces 23 concentrate the magnetic flux to cross the electrical conductor vane 7 and enter the opposed pole piece 23 and to be further turned through a right angle to enter the planar face 27 of the opposed magnet 21 of the other magnetic array 3, as shown by the flux lines in FIG. 3.

This linking of flux from each magnet 21 via the pole pieces 23 with that of an opposed magnet 21 produces a magnetic field between opposed pairs of pole pieces 23, the magnetic field passing across the gap between the magnetic arrays 3 perpendicularly through the electrical conductor vane 7. As can be seen from the flux lines on FIG. 3, the magnetic fields between adjacent pairs of opposed pole pieces 23, i.e., a first magnetic field between a pole piece 23 of one magnetic array 3 and the opposed pole piece 23 of the other magnetic array 3 and a second magnetic field between the abutting pole piece 23 of the first magnetic array 3 and the opposed pole piece 23 of the other magnetic array are in the same direction. However, the direction of the magnetic field between opposed pairs of pole pieces 23 on the other side of the magnets 21 is in the opposite direction and these alternating magnetic fields continue along the axial length of the magnetic part. This arrangement of magnets 21 and pole pieces 23 produces strong axially periodic magnetic fields between the magnetic arrays 3.

The pole pieces 23 are made from iron or other convenient high-permeability material and it will be understood that shaping the pole pieces 23 in this way strongly discourages flux leakage outwards through the side plates 9.

Due to the large magnetostatic forces between the side plates 9 to which the magnetic arrays 3 are affixed, the top and bottom plates 11 need to maintain an accurate spacing between the side plates 9. As there are no magnetic materials in the electrical conductor vane 7 there are no magnetostatic forces that draw the electrical conductor 7 towards either of the magnetic arrays 3. Therefore the bearings 19 can be lightly loaded.

The region 29 between each sloping face 24c of the pole pieces 23 and the inner surface 10 of the side plate 9 is a low permeability region of air, dielectric or a non-magnetic metal such as aluminium.

The structure of the electrical conductor vane 7 will now be described with reference to FIGS. 4 to 10.

Figure 4A:
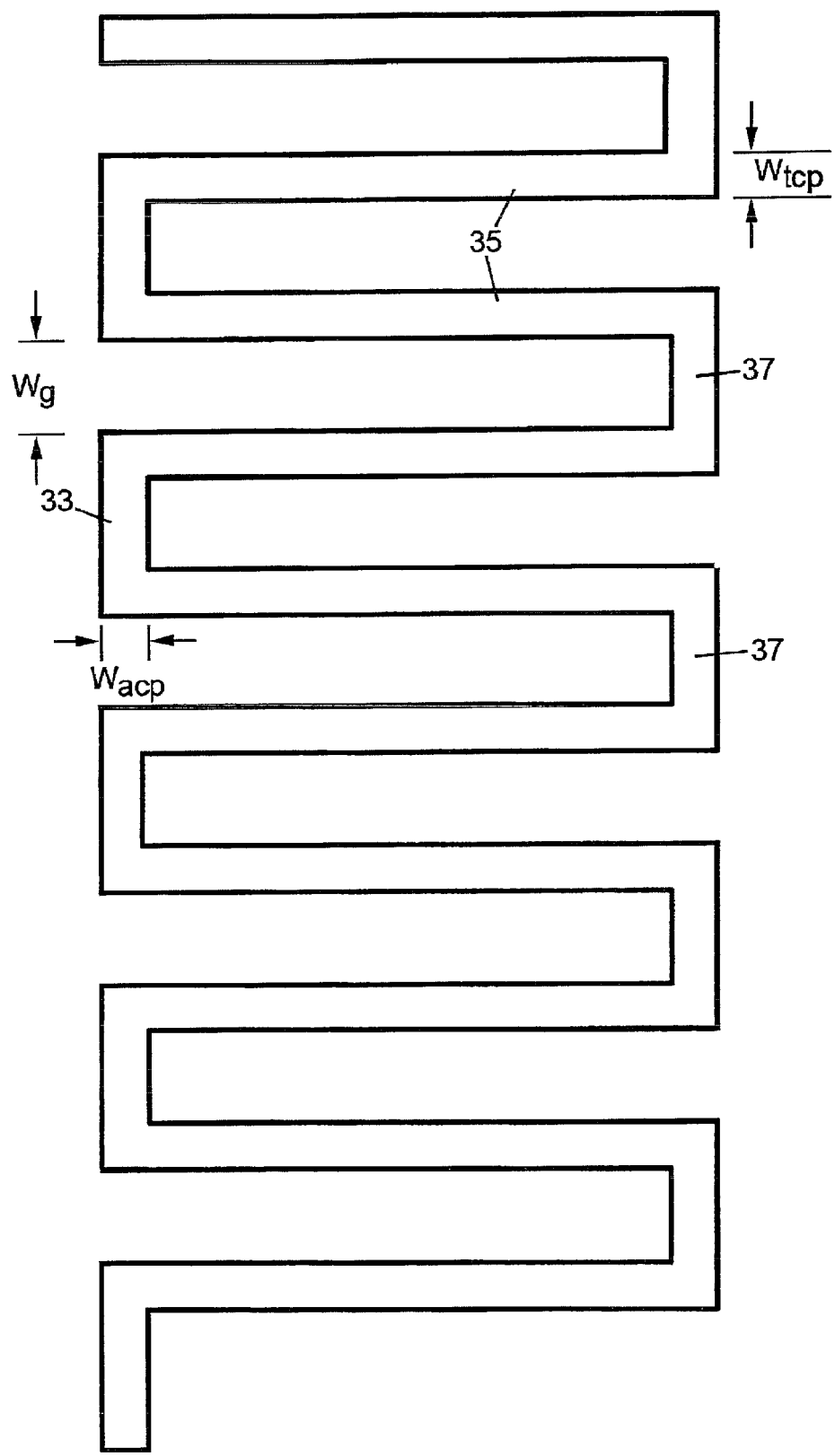
FIG. 4A is a schematic plan view of a laminar electrical conductor forming part of an electrical conductor vane of the electromagnetic machine of FIGS. 1 to 3.

FIG. 4A is a schematic plan view of a laminar electrical conductor 33 forming part of the electrical conductor vane 7 of FIGS. 1 to 3. The laminar electrical conductor 33 is comprised of a plurality of axial conducting paths 37 and a plurality of parallel transverse conducting paths 35 at right angles to the axial conducting paths 37, wherein adjacent transverse conducting paths 35 are joined at their ends by axial conducting paths 37 such that the laminar electrical conductor 33 winds in a repeating 'S'-shape pattern. The axial conducting paths 37 lie in the direction of relative motion of the electrical conductor vane 7 through the magnetic arrays 3 and the transverse conducting paths 35 run between the upper portion 13 and lower portion 15 of the electrical conductor vane 7, as shown in FIG. 1.

The width $w_{tcp}$ of the transverse conducting paths 35 is of the order of the thickness $t_{pp}$ of the pole pieces 23 (and the thickness $t_m$ of the magnets 21) so as the electrical conductor vane 7 moves through the magnetic arrays at the point then when a transverse conducting path 35 is between opposed pole pieces 23, the magnetic field passing between opposed pole pieces 23 passes through the conductor of the transverse conducting path 35. Hence matching the width $w_{tcp}$ of the transverse conducting paths 35 to the thickness $t_{pp}$ of the pole pieces 23 maximises the efficiency of the magnetic system. The width $w_{tcp}$ of the transverse conducting paths 35 is of the order of half the width $w_g$ of the gap 39 between adjacent transverse conducting paths 35 so that three laminar electrical conductors 33 can be interleaved with minimal space between adjacent transverse conducting paths 35, as is explained below.

The laminar electrical conductor 33 is coated with an electrical insulator to prevent current from passing from one conductor 33 to an adjacent conductor 33. The width $w_{acp}$ of the axial conducting paths 37, which in use act as connecting conductors between the transverse conducting paths 35, may be conveniently greater than the width $w_{tcp}$ of the transverse conducting paths 35 so as to reduce the resistance of the axial conducting paths 37 and improve machine efficiency. The laminar electrical conductor 33 may be made from metallic sheet, strip, ribbon or foil.

Figure 4B:
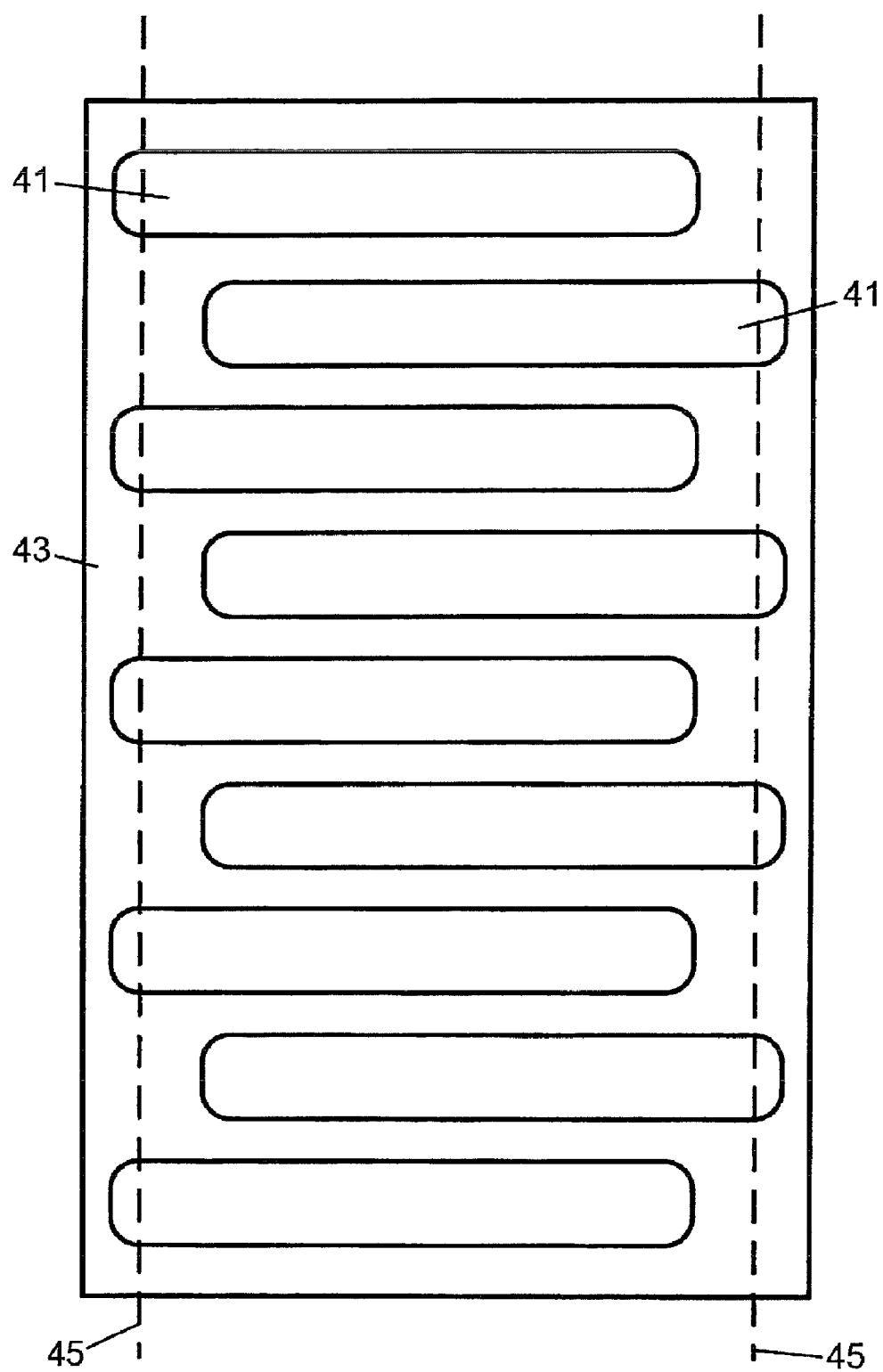
FIG. 4B is a simplified representation showing how the laminar electrical conductor of FIG. 4A is formed.

FIG. 4B is a simplified representation showing how the laminar electrical conductor 33 of FIG. 4A is formed. Generally rectangular apertures 41 are formed in a rectangular plate 43 of a conductor, for example aluminium. Adjacent apertures 41 are laterally offset from each other and alternate apertures 41 are aligned to form two offset columns of apertures 41. Once the apertures 41 are formed in the plate 43, for example by punching, the plate 43 is cut along lines 45 through the ends of the apertures 41 to form the repeating 'S'-shaped pattern of the laminar electrical conductor 33 described above. If the laminations are made of aluminium the necessary surface electrical insulation may be conveniently formed by a hard anodising process.

Figure 5:
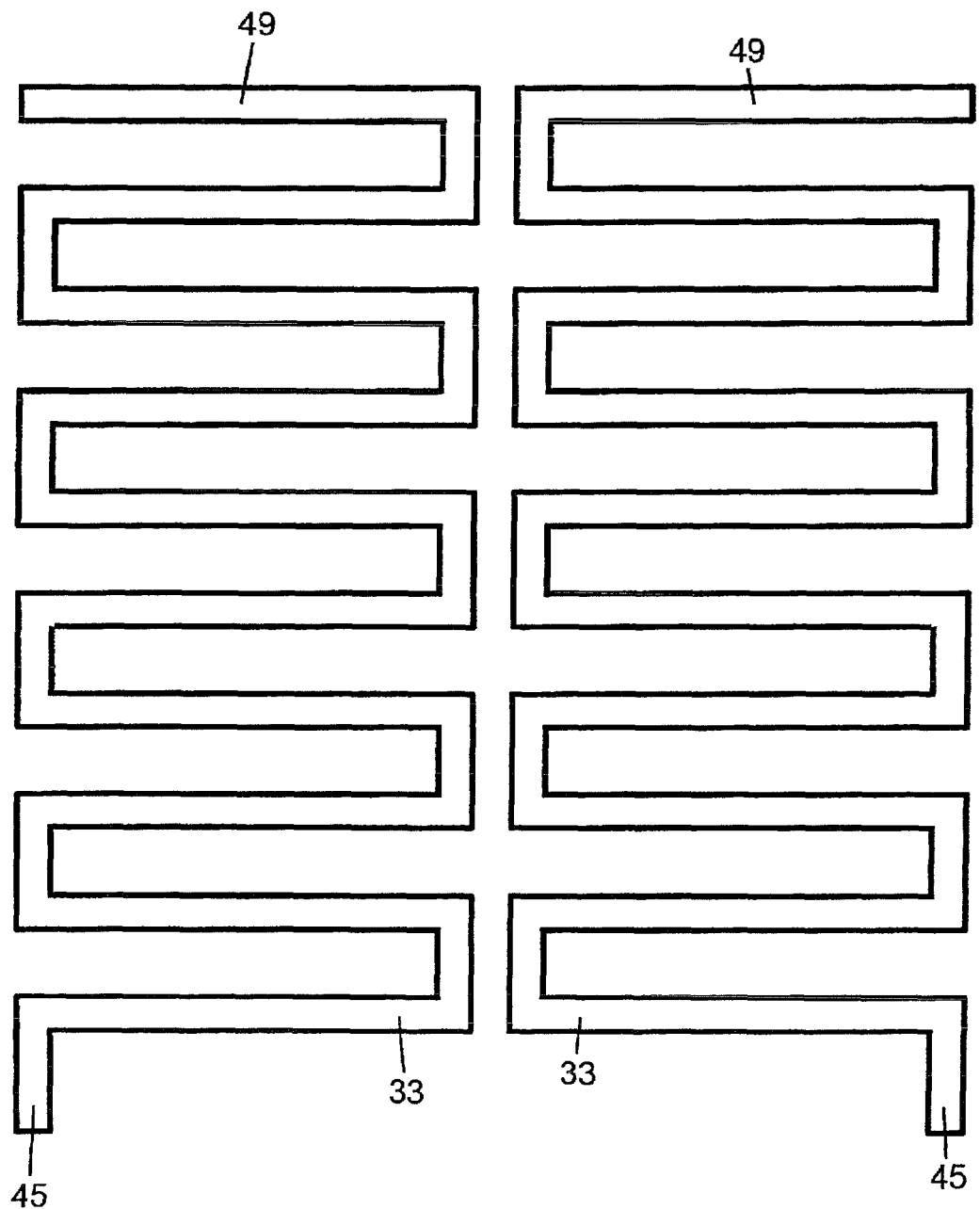
FIG. 5 is a schematic representation of two laminar electrical conductors of FIG. 4A.
Figure 6:
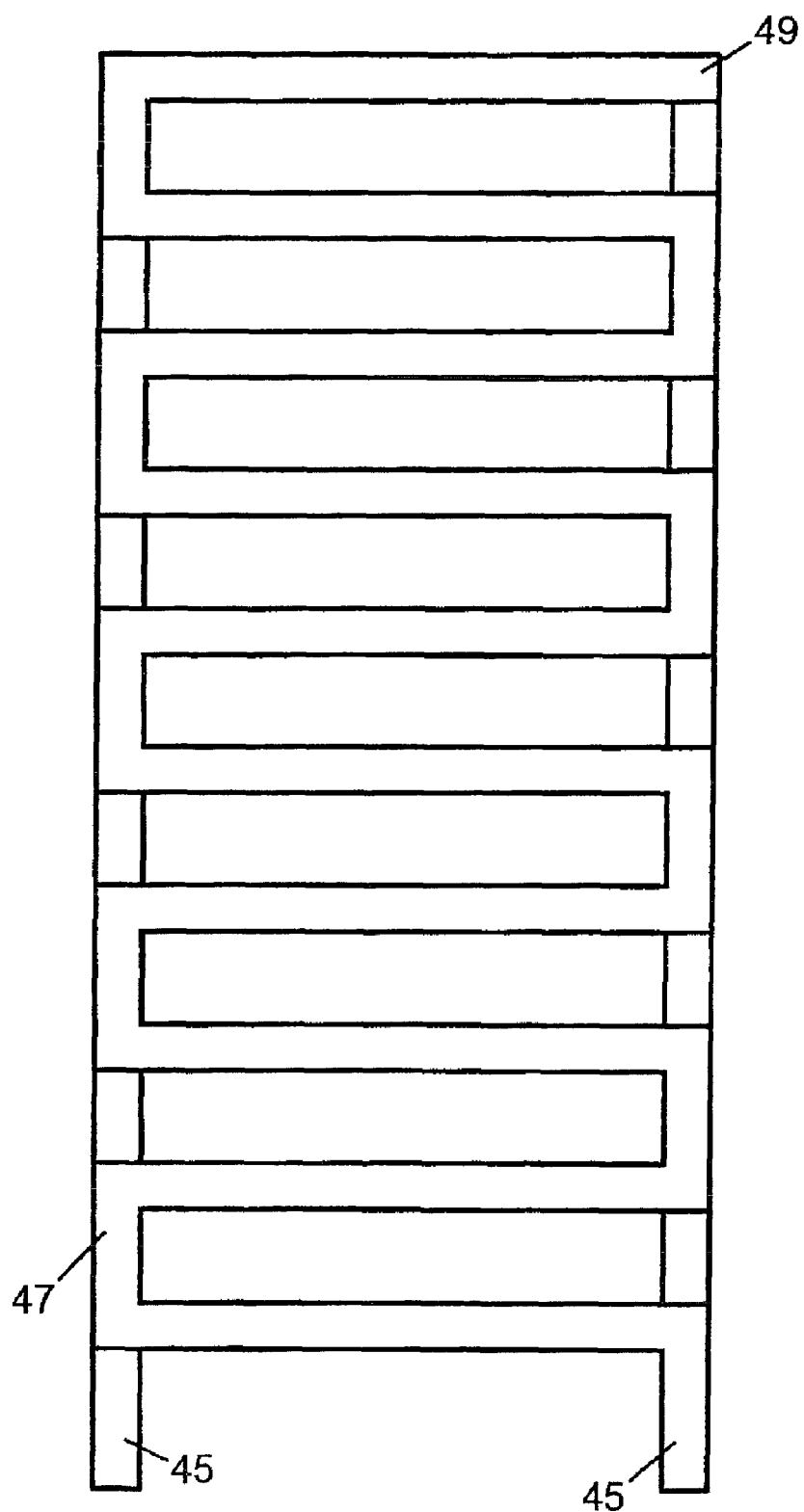
FIG. 6 is a schematic representation of a phase conductor formed by bonding the two laminar electrical conductors of FIG. 5.

FIG. 5 is a schematic representation of two identical laminar electrical conductors 33 of the kind illustrated in FIG. 4A, one being reversed with respect to the other. A connection tag 45 is formed at an end of each of the laminar electrical conductors 33. The two laminar electrical conductors 33 of FIG. 5 are disposed precisely one on top of the other and bonded together to form a phase conductor 47 as shown in FIG. 6, the phase conductor forming part of the electrical conductor vane 7 of FIGS. 1 to 3.

The transverse conducting paths 49 at the end of the laminar electrical conductors 33 distal to the connection tags 45 are welded together to form a high-quality electrical connection. It will be understood that there is now a continuous electrical path between the two connection tags 45, by which current may be caused to flow along the series-connected laminations, passing always in the same direction through each pair of aligned transverse conducting path 35. It will also be noted that, whilst the laminar electrical conductor 33 may be mechanically weak, when two laminar electrical conductors 33 are bonded together to form a phase conductor 47, and when a plurality of phase conductors 47 are bonded together to form an electrical conductor vane 7 as described below, the electrical conductor vane 7 is a rigid self-supporting structure. It will be understood that the technique of reversing alternate conducting layers may be extended to the use of many layers, so as to achieve any desired performance specification.

Figure 7:
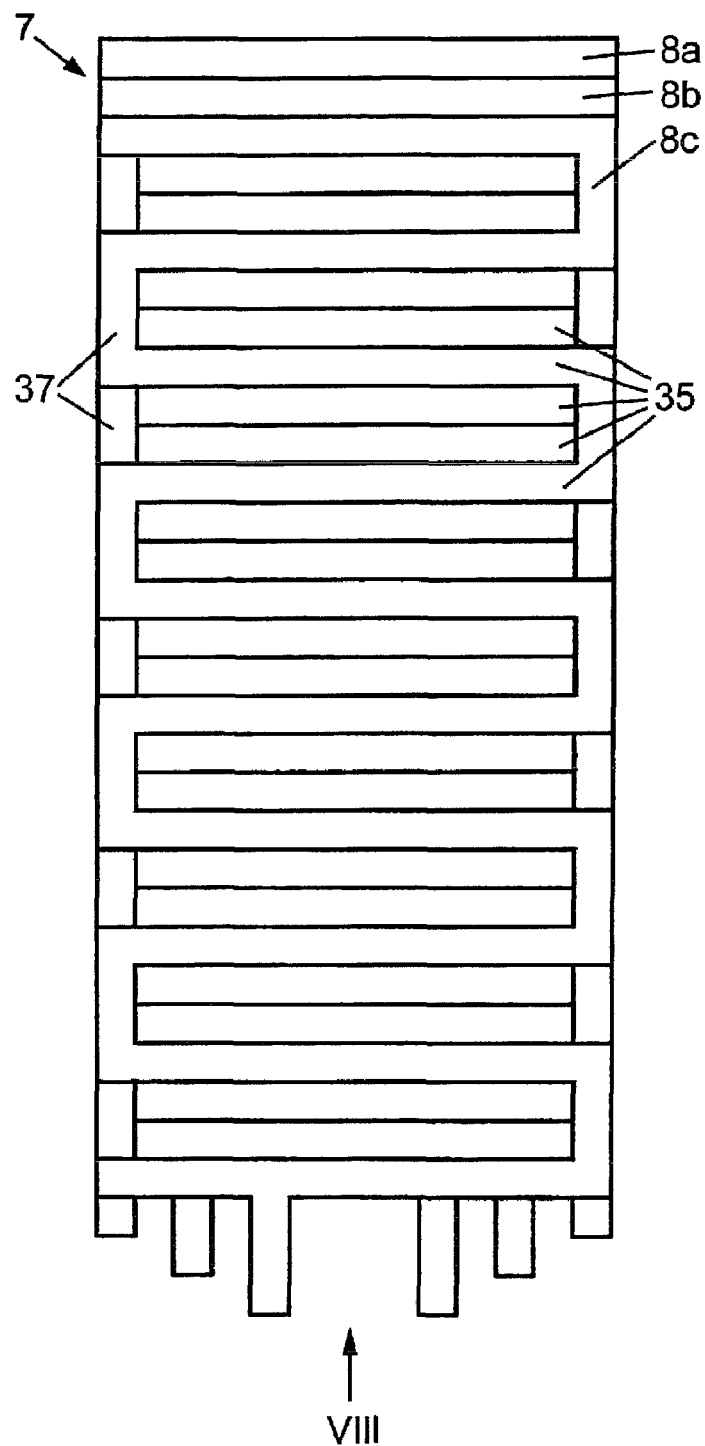
FIG. 7 is a schematic plan view of the electrical conductor vane of FIGS. 1 to 3.

FIG. 7 is a schematic plan view of the electrical conductor vane 7 of FIGS. 1 to 3. The electrical conductor vane 7 is formed by interleaving three sets 8a, 8b, 8c of phase conductors 47 as shown in FIG. 6, each set 8a, 8b, 8c comprising two phase conductors 47. Each set 8a, 8b, 8c of phase conductors 47 carries one phase and it will be seen that the thrust-producing actuating conductors of the transverse conducting paths 35 in the high-density magnetic fields produced by the magnets 21 of the magnetic arrays 3 are interdigitated with one another in a central region, whereas the axial conducting paths 37 of the electrical conductor vane 7 overlap one another at the upper 11 and lower 13 portions of the electrical conductor vane 7, where the current path is in an axial direction. The axial conducting paths 37 of the laminar electrical conductors 33 therefore correspond with the end windings of a conventional motor. It can seen that the transverse conducting paths 37 which form that actuating conductors are tightly packed with minimal air gaps between the conductors thereby maximising magnetic flux transfer to the electrical conductor vane 7 when disposed in a magnetic field produced by the magnetic arrays 3.

Figure 8:
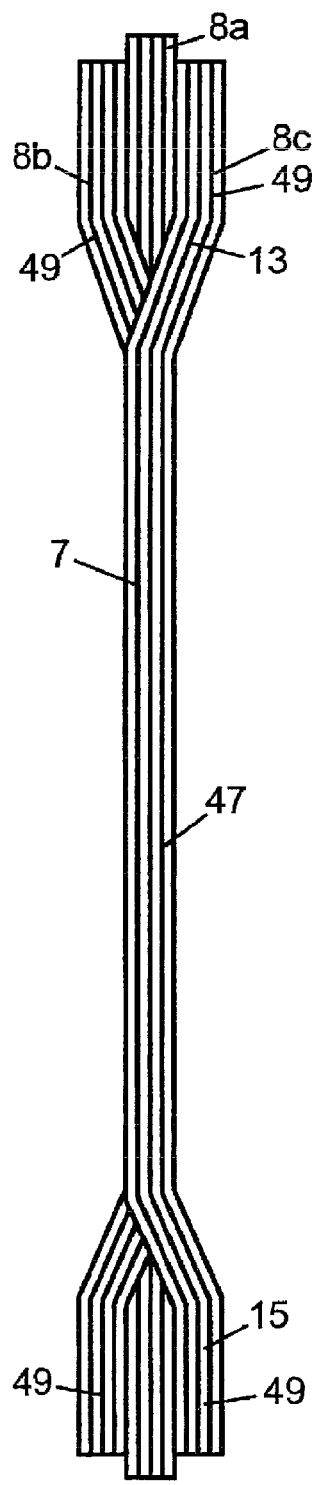
FIG. 8 is an end view of the electrical conductor vane of FIG. 7.

FIG. 8 is an end view of the electrical conductor vane 7 of FIG. 7 in the direction of the arrow VIII showing the interleaved sets 8a, 8b, 8c of phase conductors 47. The central set 8a of phase conductors 47 of the electrical conductor vane 7 is substantially flat. As the sets 8a, 8b, 8c of phase conductors 47 overlap at the upper 13 and lower 15 portions of the electrical conductor vane 7, in the region of the axial conducting vanes 37, the end portions 49 of the second 8b and third 8c sets of phase conductors 47 are bent outwards so that when a central portion of the transverse conducting paths 35 are interdigitated and lie in the same plane (as shown in FIG. 3) the axial conducting paths 37 of each phase conductor 47 are disposed one on top of the other.

Figure 9:
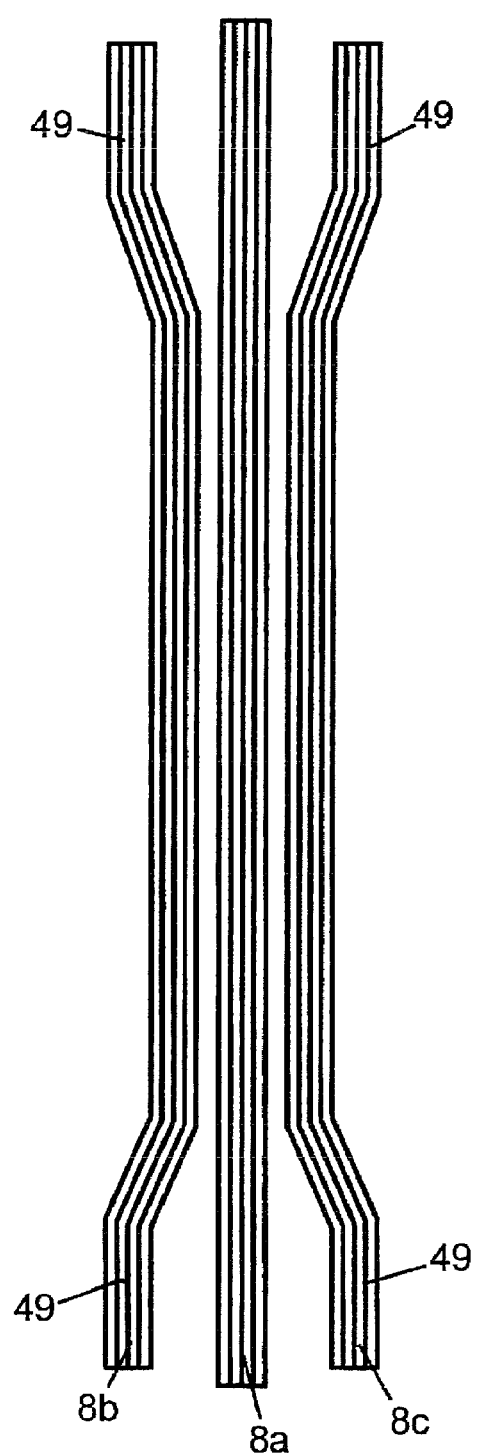
FIG. 9 is an exploded view of the electrical conductor vane of FIG. 8.

FIG. 9 is an exploded view of the electrical conductor vane 7 of FIG. 8 showing the separated sets 8a, 8b, 8c of phase conductors 47 before they are interleaved and bonded together to form a strong mechanical structure of precisely defined dimensions. Each set 8a, 8b, 8c of phase conductors 47 of the electrical conductor vane 7 of FIGS. 8 and 9 consists of four laminar electrical conductors 33, i.e., two pairs of phase conductors 47. It will be understood by the person skilled in the art that the invention is not limited to this number of laminar electrical conductors 33 but one or many laminar electrical conductors 33 may be used to form an electrical conductor vane 7, depending on the desired specification of the motor design. Using a plurality of bonded laminar electrical conductors 33 increases the flexural rigidity of the phase conductor 47 and consequently the flexural rigidity of the resulting electrical conductor vane 7.

Figure 10:
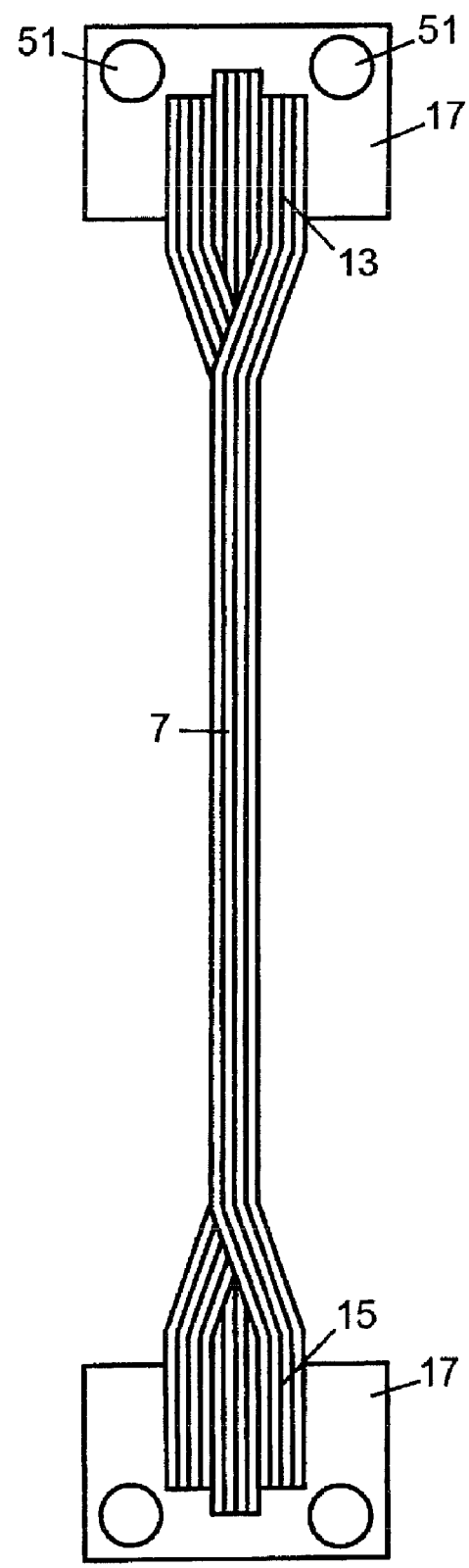
FIG. 10 shows in schematic form how the electrical conductor vane is precisely fitted into cap beams.

FIG. 10 shows in schematic form how the upper 13 and lower 15 portions of the electrical conductor vane 7 are precisely fitted into cap beams 17. The cap beams 17 are the means by which the electromagnetic forces generated in the vane 7 are transferred to the body of the motor or to a load. The cap beams 17 provide extra longitudinal stiffness to the electrical conductor vane 7 and they are also the means whereby heat generated in the body of the electrical conductor vane 7 is conducted away from the plates of the end windings. Coolant channels 51 are provided in the cap beams 17 as one means by which heat generated in the electrical conductor vane 7 can be conveyed from the electrical conducting vane 7. In an alternative embodiment the electrical conductor vane 7 may be disposed in a single cap beam 17.

In use, current is supplied to the individual sets 8a, 8b, 8c of phase conductor 47 of the elemental linear actuator 1 under the control of a standard industrial electronic drive unit for a brushless three-phase motor. When current flows through the laminar electrical conductors 33 and in particular through the electrically insulated conductors of the transverse conducting paths 35 which intersect the magnetic fields across the gap between the magnetic arrays 33, an electromagnetic force is induced to cause the movement of the electrical conductor vane 7 relative to the magnetic arrays 3. As the current passing through, in particular, the transverse conducting paths 35 induces the electromagnetic force the transverse conducting paths 35 can be considered as actuating conductors. The set of closely packed electrically insulated conductors of a group of transverse conducting paths 35 in a magnetic field between opposed pole pieces 23 substantially fills the gap between the first and second magnetic arrays 3 through which said magnetic field passes to provide a magnetic transfer system of optimum efficiency.

It will be understood by the person skilled in the art that an air gap exists between the conductor vane 7 and the magnetic arrays 3 to allow relative movement between the conductor vane 7 and the magnetic arrays 3 without one part contacting the other part and that the electrically insulated conductors substantially fill the gap the conductor vane 7 and the magnetic arrays 3 to the extent that a necessary air gap is present. It will also be understood that the electrical conductor filling the gap refers to the volume of the conductor including its electrical insulation, which is required to prevent current leakage between conductors.

The position of the electrical conductor vane 7 and its relationship to the individual magnetic force units 25 of the stator is measured by a position transducer (not shown).

In this embodiment the magnetic arrays 3 have been described as acting as the stator and the electrical conductor vane 7 has been described as acting as the armature. However the skilled person will understand that the electrical conductor vane 7 can be fixed, acting as a 'stator', and that the magnetic arrays 3 and associated housing 5 can move, acting as the 'armature'.

There is no inherent limitation to the length of the electrical conductor vane 7, which may conveniently be divided into electrically discrete sections so that power is only fed to that part of the electrical conductor vane 7 adjacent the magnetic force units 25 at any time. The centre line of the electrical conductor vane 7 does not need to be rectilinear but the electrical conductor vane 7 and the path formed between opposed force units 25 may be curved so that the locus of relative motion between the armature and stator follows a smooth curve that does not cause the armature to collide with the stator at any point. Especially unique to such an elemental machine is that, subject to proper clearance between itself and the armature, the centre line of the wireless stator vane may follow a smooth path in three dimensions. Further, the plane of the stator (and thus of the armature) may also be arranged to rotate smoothly around its own axis as it proceeds. It will be understood that, to increase the ability of the armature to follow the curving path of the stator, the armature may need to include articulations or incorporate flexible materials, for example.

It is explained below how the elemental machine described above may be used to construct wireless electrical machines having a variety of topologies. In the following diagrams, by way of example and without limitation, we have chosen to concentrate on a brushless three-phase permanent magnet configuration. Nevertheless, by application of the same principles it is also possible to design wireless electrical machines of other configurations.

Figure 11:
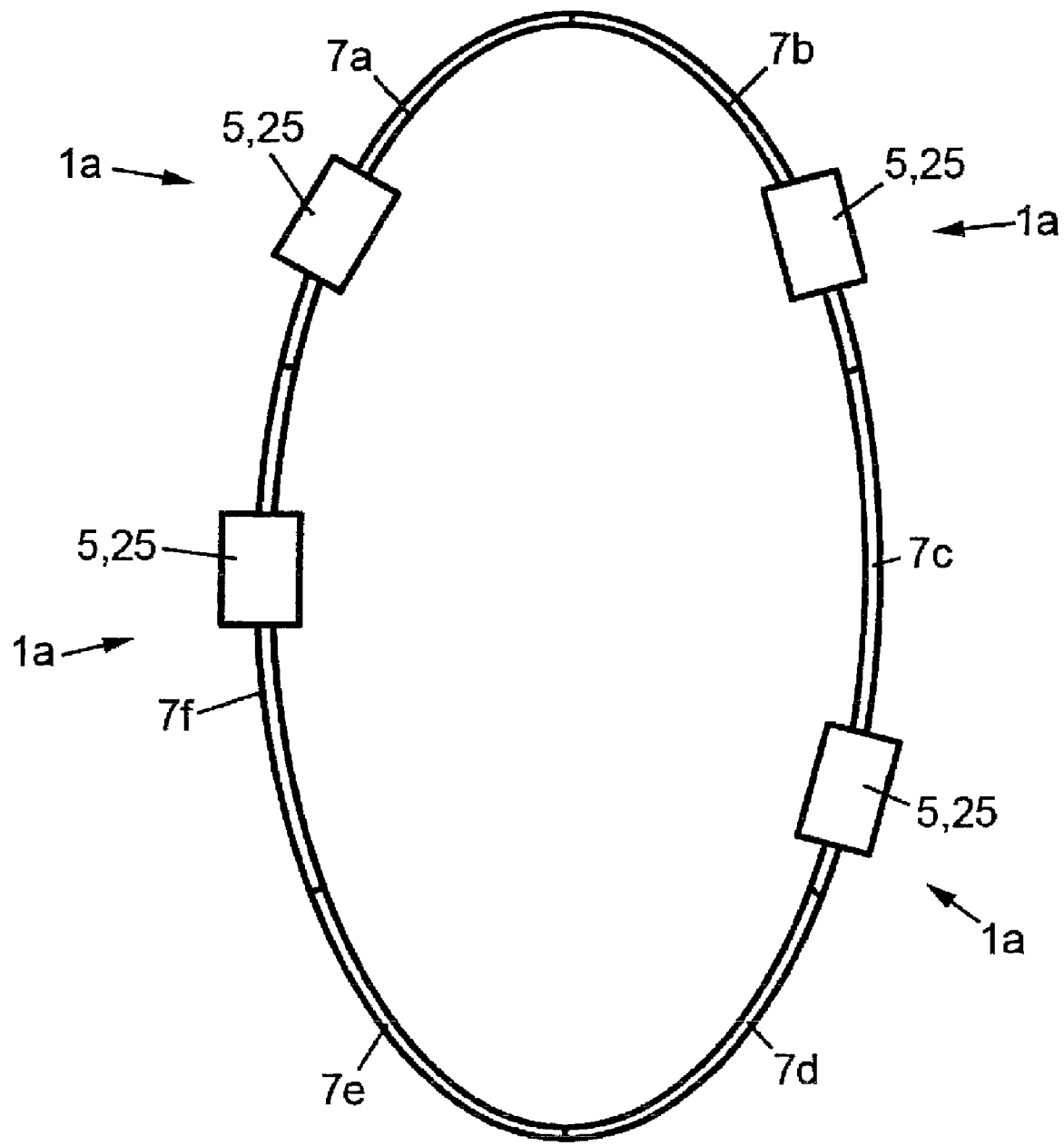
FIG. 11 shows in schematic form a second embodiment of the invention.

FIG. 11 shows in schematic form a further embodiment of the invention in which a plurality of elemental linear actuators 1a of similar form to the actuator shown in FIGS. 1 to 10, can be used on a track, for example a loop of track surrounding a processing centre of a manufacturing facility. In this embodiment the armature comprises magnetic force units 25 and an associated housing 5 which are arranged to move along stators which comprise electrical conductor vanes 7a-f. Each armature is controlled independently in track sectors/electrical conductor vanes 7a-f, so that the armatures may move back and forth along the same stator, within limits that prevent collisions. In this arrangement each track segment 7a-f has its own electronic drive (not shown) and each armature 5, 25 has its own position transducer (not shown) that communicates with the electronic drive appropriate to the position of the armature at that time. It will be understood that the same control principle can be applied, for example, to several overhead cranes moving on the same rail system or to several elevator cars moving in the same shaft.

Figure 12:
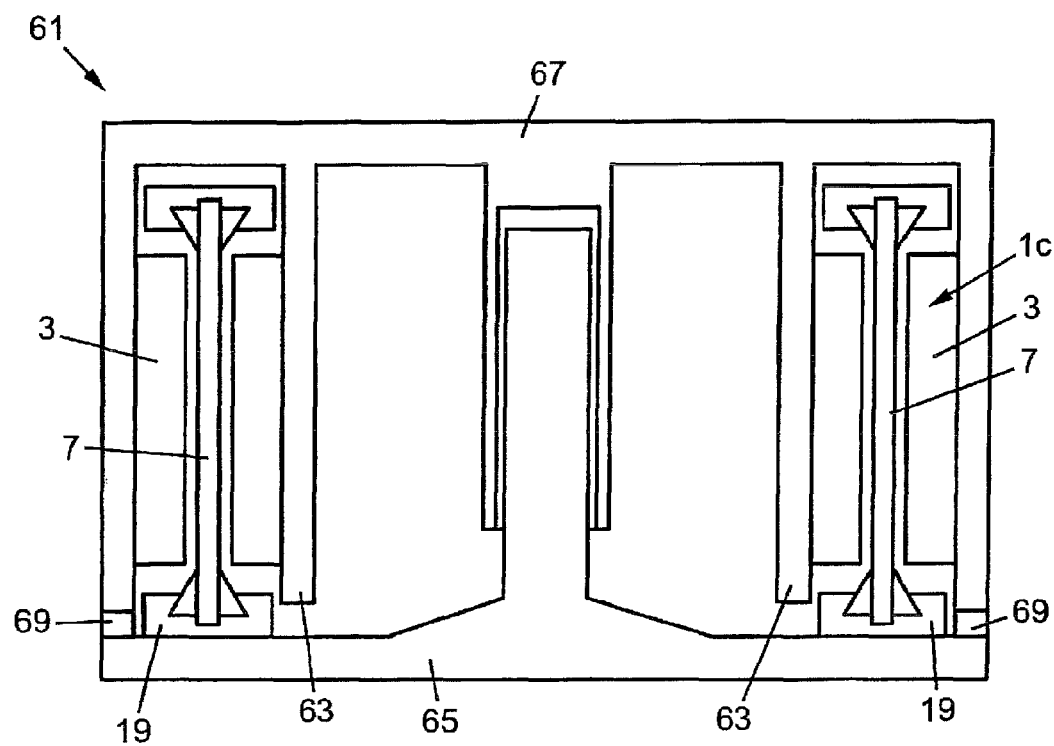
FIG. 12 shows in schematic form a cross section through a rotary machine forming a further embodiment of the invention.

FIG. 12 shows in schematic form a cross section through a rotary machine 61 forming a further embodiment of the invention. The high torque rotary machine 61 is formed by arranging an elemental actuator 1c of the type shown in FIGS. 1 to 10 such that the electrical conductor vane 7 follows a circular path and by extending the length of the magnetic arrays 3 comprising magnets and associated pole pieces into a double ring of magnetic force units 25 so as to surround the cylindrical electrical conductor vane 7 on its inner and outer circumferences. It will be understood that the stator may be the magnetic part and the armature may be the electrical part without change of this principle. In this diagram the numbers refer to the same motor parts as in previous figures. The electrical conductor vane 7 comprises sets of phase conductors 47 formed in a cylindrical shape with the transverse electrical conductors 35 lying substantially parallel to the axis of relative rotation. The cylindrical electrical conductor vane 7 is mounted to the lower part 65 of the motor 61 whilst the magnetic arrays 3 are also formed in a circle and mounted-via cylindrical plates 63 to the upper part 67 of the motor 61, which rotates relative to the lower part 65 by means of bearings 19 and seal units 69.

Figure 13:
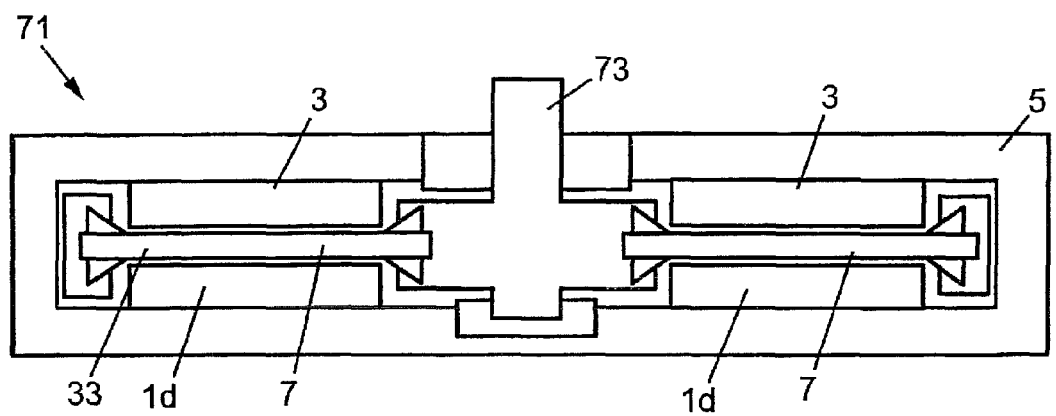
FIG. 13 shows an alternative arrangement of a rotary machine forming a further embodiment of the invention.

FIG. 13 shows an alternative arrangement of a rotary machine 71 forming a further embodiment of the invention comprising elemental electromagnetic actuators 1d of the type shown in FIGS. 1 to 10. In this configuration the electrical conducting vane 7 has an annular shape and is assembled from annular laminar electrical conductors 33 where the transverse conducting paths 35 are arranged substantially radially. Again, it is possible for the machine to exist in complementary form, so that the magnetic arrays 3 forming the magnetic part are fixed and the electrical conductor vane 7 forming the electrical part rotates. In this diagram the electrical conductor vane 7 transfers its force (torque) to an armature shaft assembly 73 whilst the magnetic arrays 3 are mounted on the housing 5.

The configuration described above may at first appear to be similar to that of a printed circuit motor, but it should be noted that the armature's laminar electrical conductors 33:

1. are not printed but are wholly self-supporting and without any substrate thereby benefiting from a reduced weight and consequently reduced inertia and reduced cost;
2. are conductors that are not configured as coils but have surface areas that are matched to those of the pole pieces 23;
3. comprise transverse conducting paths 35 which are interdigitated in the magnetic field region and the axial conducting paths 37 are overlaid elsewhere;
4. are designed to carry much larger currents than the conductors of conventional printed circuit motors;
5. move in a higher-density magnetic flux than is commonly employed for printed circuit motors; and
6. resemble the conductors of a three-phase servomotor and not a DC machine.

It will be understood, therefore, that the configuration shown in FIG. 13 is not an obvious extension of, nor is it derived in any way from, the prior art of a printed circuit motor.

The distinction will become clearer as we now consider the special advantages of the elemental wireless electromagnetic motor when it is necessary for the electromagnetic force (thrust or torque) to be uncommonly large.

The thrust of any electromagnetic machine forming an embodiment of the invention may be increased by using larger electrical conducting vanes 7 and larger planar magnets 21. However, the size increase soon encounters the same magnet size limitation that was previously mentioned in connection with the earlier cylindrical linear actuators. It is extremely difficult both to manufacture and to magnetise a Neodymium Iron Boron magnet having an area greater than about 0.015 sq m (say 150 mm by 100 mm).

However, because the elemental wireless linear actuator forming an embodiment of the invention of the type shown in FIGS. 1 to 10 is narrow in cross-section, it is possible to stack a number of motor elements closely together in a small space. There is a further advantage in so doing, as is explained below.

Figure 14A:
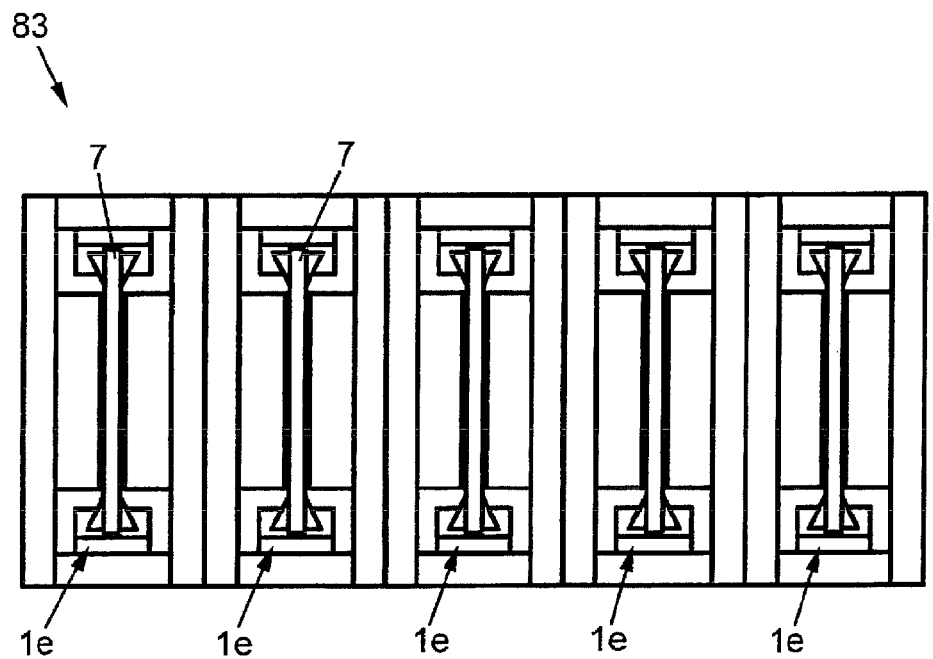
FIG. 14A is a schematic cross section of a linear machine forming a further embodiment of the invention.

FIG. 14A is a schematic cross section of a number of elemental electromagnetic motor elements 1e, each being similar in structure to that shown in FIGS. 1 to 10, but now stacked parallel to each other and closely together to form a linear motor 83. It will be understood that it is possible to connect the electrical conductor vanes 7 together mechanically and electrically, and to drive them from the same electronic unit. It will also be understood that the armatures may also be coupled so that the thrust produced by any one elemental machine 1e is multiplied by the number of machines that are acting together.

Figure 14B:
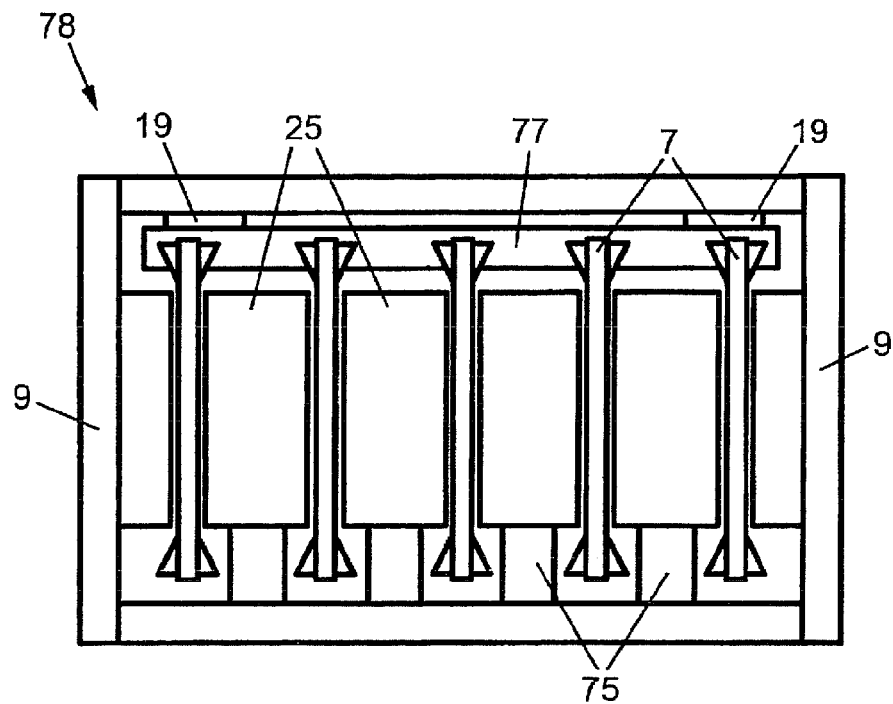
FIG. 14B is a schematic cross section of a linear machine forming a further embodiment of the invention.

FIG. 14B shows how it is possible to simplify the structure of the concatenation of FIG. 14A and to achieve a linear motor 78 having a more convenient and economical close packing. It should be noted that the magnetic force units 25 are made common to the electrical conductor vanes 7 on either side of them. Thus, although there are strong magnetostatic forces between adjacent magnetic force units 25, in this arrangement those forces are generally equal and opposite. For that reason the intermediate framework shown in FIG. 14A can be eliminated and the magnetic force units 25 may be held only by robust supports 75. All of the electrical conductor vanes 7 are fitted precisely into a common frame 77, which is fitted with bearings 19 so that it may move relative to the framework of the magnetic force units 25. It also becomes possible to bring the electrical conductor vanes 7 clear of the magnetic parts without danger of the magnetostatic forces closing the slots through which the vanes 7 pass. Only the ends of the side plates 9 experience unbalanced magnetostatic forces and they must therefore be of robust construction.

Figure 15:
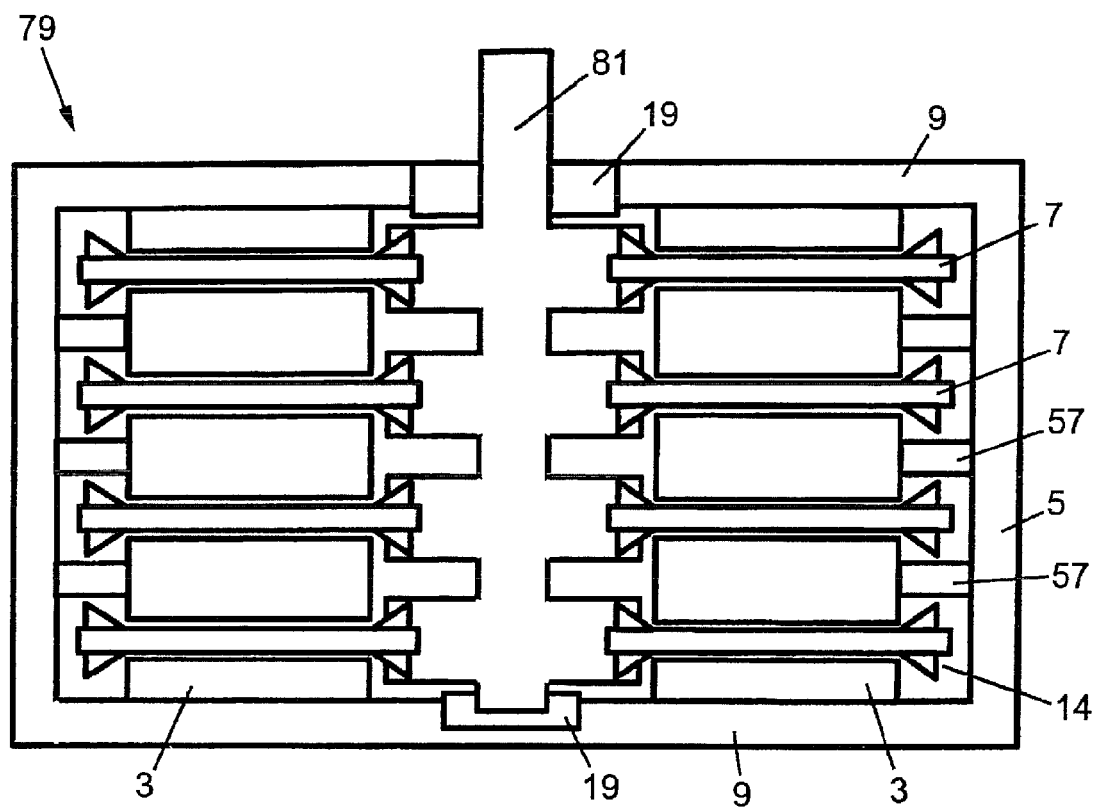
FIG. 15 is a schematic cross section of a rotary machine forming a further embodiment of the invention.

FIG. 15 is a schematic cross section of a very high torque rotary motor 79 forming a further embodiment of the invention in which the principle of concatenation of wireless motor elements described above is applied to the rotary motor 71 of FIG. 13. Several motors of the type shown in FIG. 13 are combined to drive the same shaft 81 and the intermediate structure is simplified in the same way as for the elemental linear motors of FIG. 14.

In this example the electrical conductor vanes 7 take the form of punched discs that are interdigitated and bonded to form a self-supporting structure in the manner previously described for rectilinear laminations. The annular electrical conducting vanes are embedded in and keyed to a central shaft 81 that runs in bearings 19. The magnetic arrays 3 are also in the form of rings that are affixed to the housing 5 by locating rings 57.

It will be understood that although in this illustration only four stacked rotary motor elements 1f are shown, there is no inherent limitation to the number of rotary elements 1f that may be employed to produce a very high torque rotary machine.

It will also be understood that the motor illustrated in FIG. 15 is a moving conductor machine, having the advantage of low rotor inertia and a high rotor torque. Nevertheless, in some applications it may be advantageous to build an equivalent machine in which the electrical system is the stator and the magnetic system is the rotor.

The magnetostatic forces between the magnetic force units 25 are balanced in the central region and significant unbalanced magnetostatic forces only exist between the side plates 9 and the adjacent locating rings 57.

Figure 16:
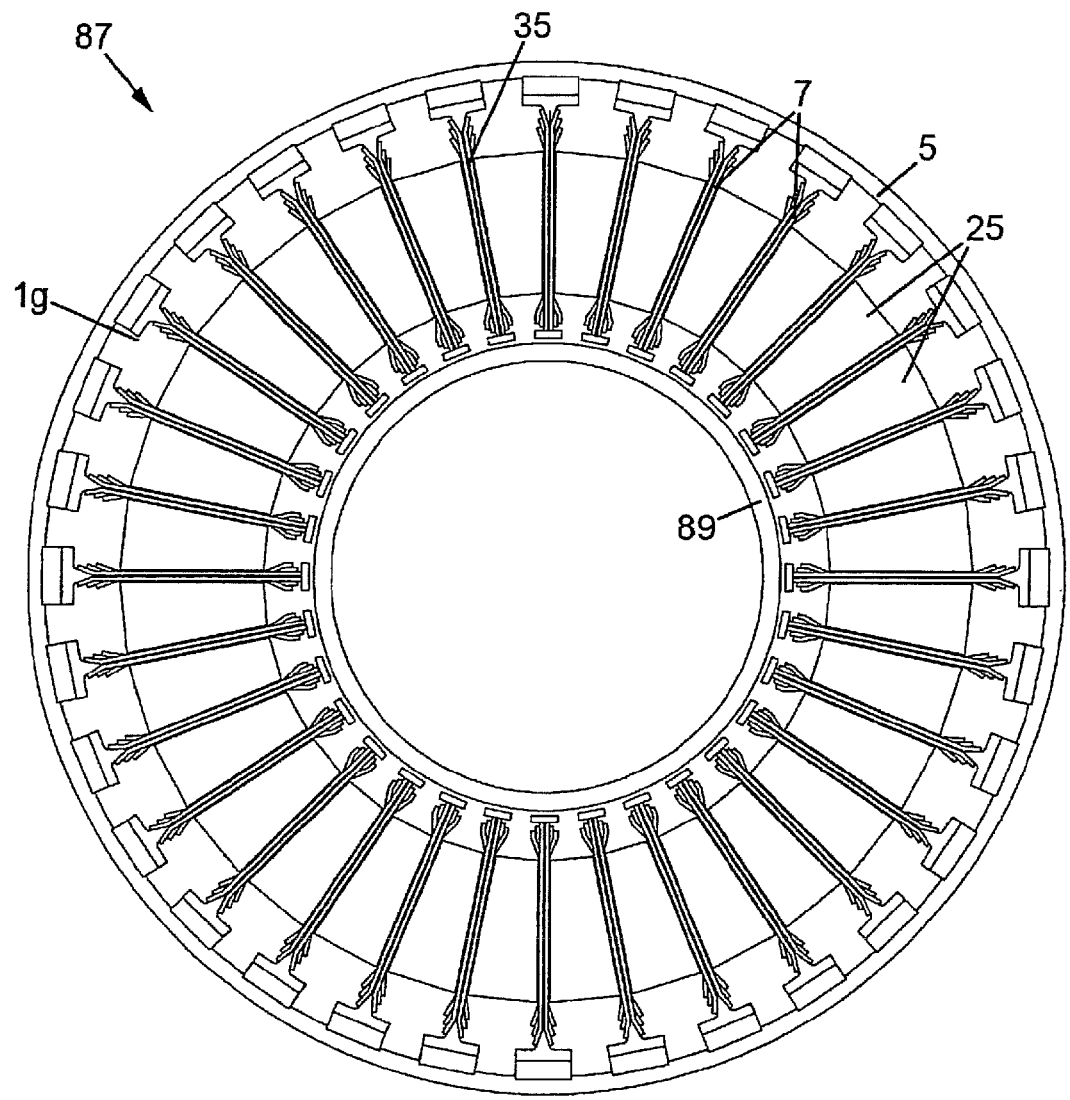
FIG. 16 shows in schematic form a linear machine forming a further embodiment of the invention.

FIG. 16 shows in schematic form a linear motor 87 forming a further embodiment of the invention. In the case of this linear motor 87, the end forces referred to in the previous paragraph may be completely eliminated and the magnetostatic forces are balanced throughout the system. This is achieved by closing the stack of elemental electromagnetic machines 1g on itself to form a circular or polygonal array. The machine has an even number of elemental electromagnetic machines 1g disposed therein so that the polarity of opposed faces of the magnets are opposed. By such means it is possible to produce a compact and highly-efficient linear actuator 87 having a thrust more than an order of magnitude greater than the thrust of any individual motor element.

By way of example FIG. 16 shows a 32-element circular array in which the elements are of a similar form as described with reference to FIGS. 1 to 10. The electrical conductor vanes 7 are affixed to the outer housing 5 and alternate with the magnetic force units 25 which are affixed to the armature thrust tube 89. Currents flowing in the radially-disposed transverse conducting paths 35 of the electrical conductor vanes 7 cause the magnet arrays 3 (and thus the thrust tube) to experience an electromagnetic force into or out of the plane of the Figure.

Figure 17:
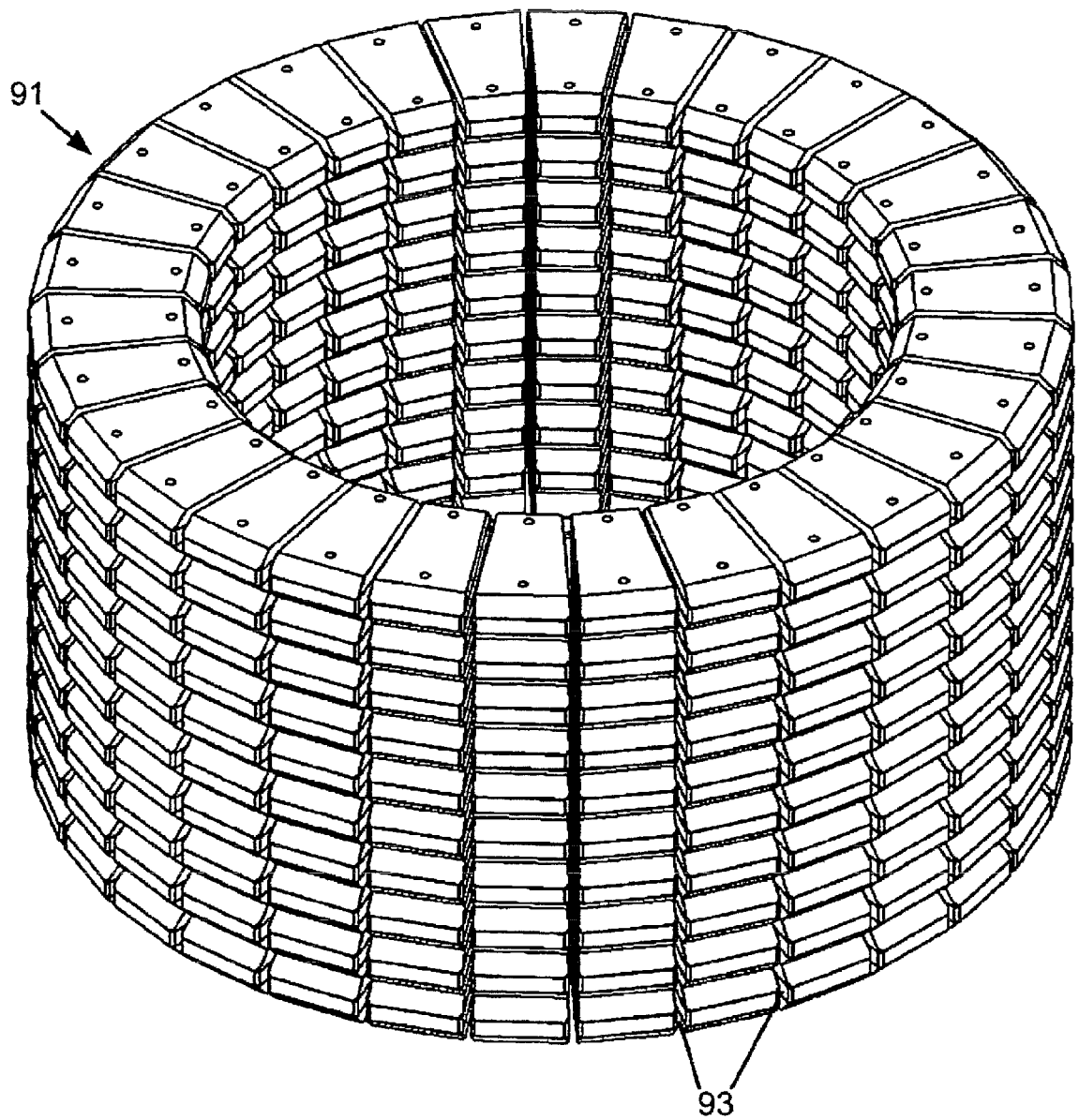
FIG. 17 is an illustration of an armature or magnetic assembly forming part of an electrical machine forming a further embodiment of the invention.

FIG. 17 is an illustration of an armature or magnetic assembly 91 forming part of an electrical machine forming a further embodiment of the invention. It will be understood that electrical conductor vanes 7 are to be disposed in slots 93 around the armature and that directions of the magnetic fields are reversed in alternate slots of the armature so that all the mechanical forces are balanced.

Although the magnetic armature is large, it is assembled from small magnets and pole pieces that are installed one at a time and laid in a circle, each strongly attracting its neighbours laterally and (much less strongly) repelling its neighbours vertically. The magnetic armature is constructed in a jig by placing the magnetic force units side by side as a series of tiles. When one circular layer is complete, the next layer is built upon it, one magnetic force unit at a time. The design thus overcomes the principal scaling limitations of conventional cylindrical electromagnetic actuators and it allows a massive and powerful armature to be assembled safely.

Figure 18:
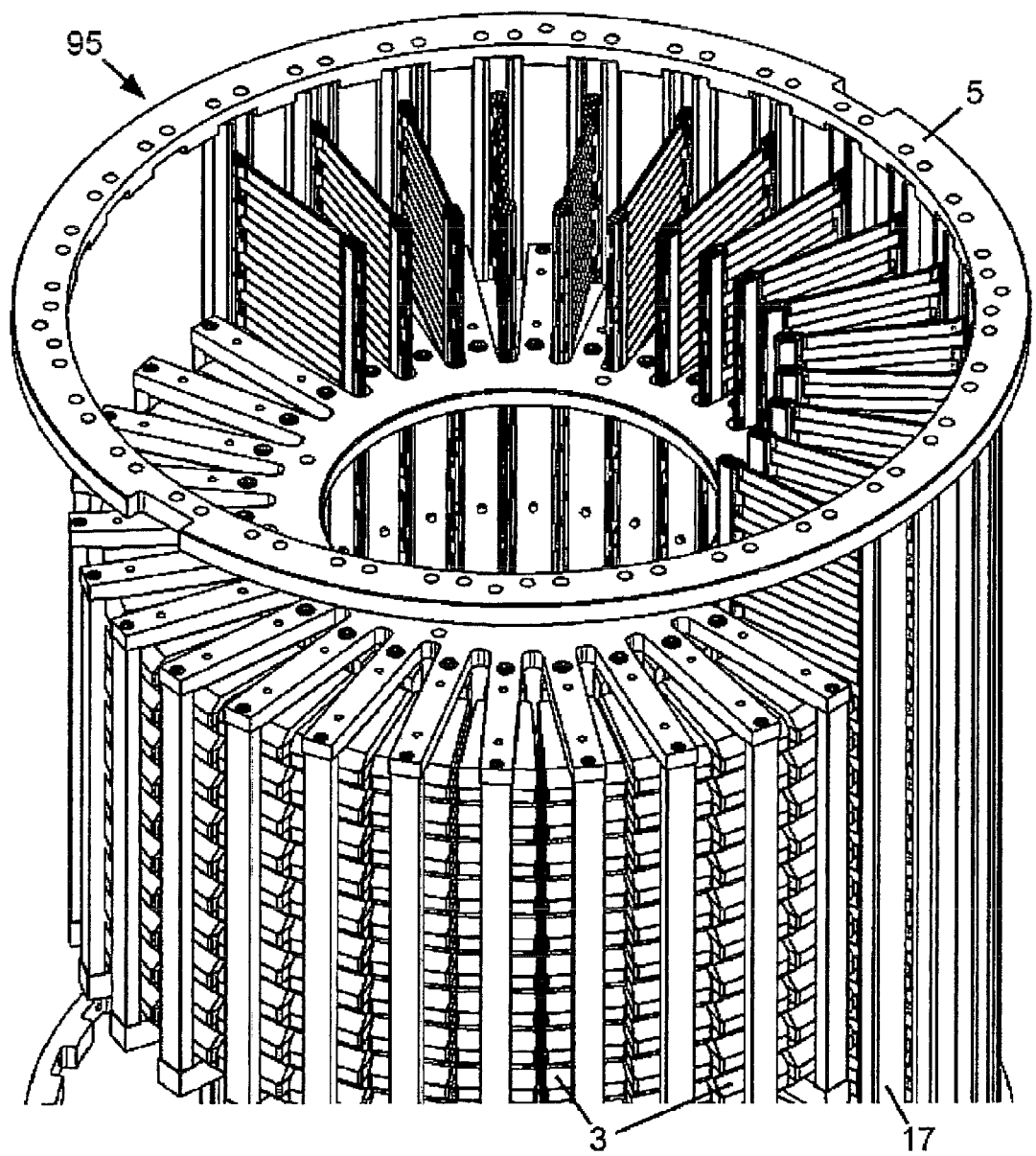
FIG. 18 is a part cut-away perspective view of an electrical machine forming a further embodiment of the invention.

FIG. 18 is a part cut-away perspective view of an electrical machine 95 forming a further embodiment of the invention, in which it will be seen that the electrical conductor vanes 7 are fitted via cap beams 17 to the housing 5 and that they pass through slots in the periodic magnet arrays 3.

Figure 19:
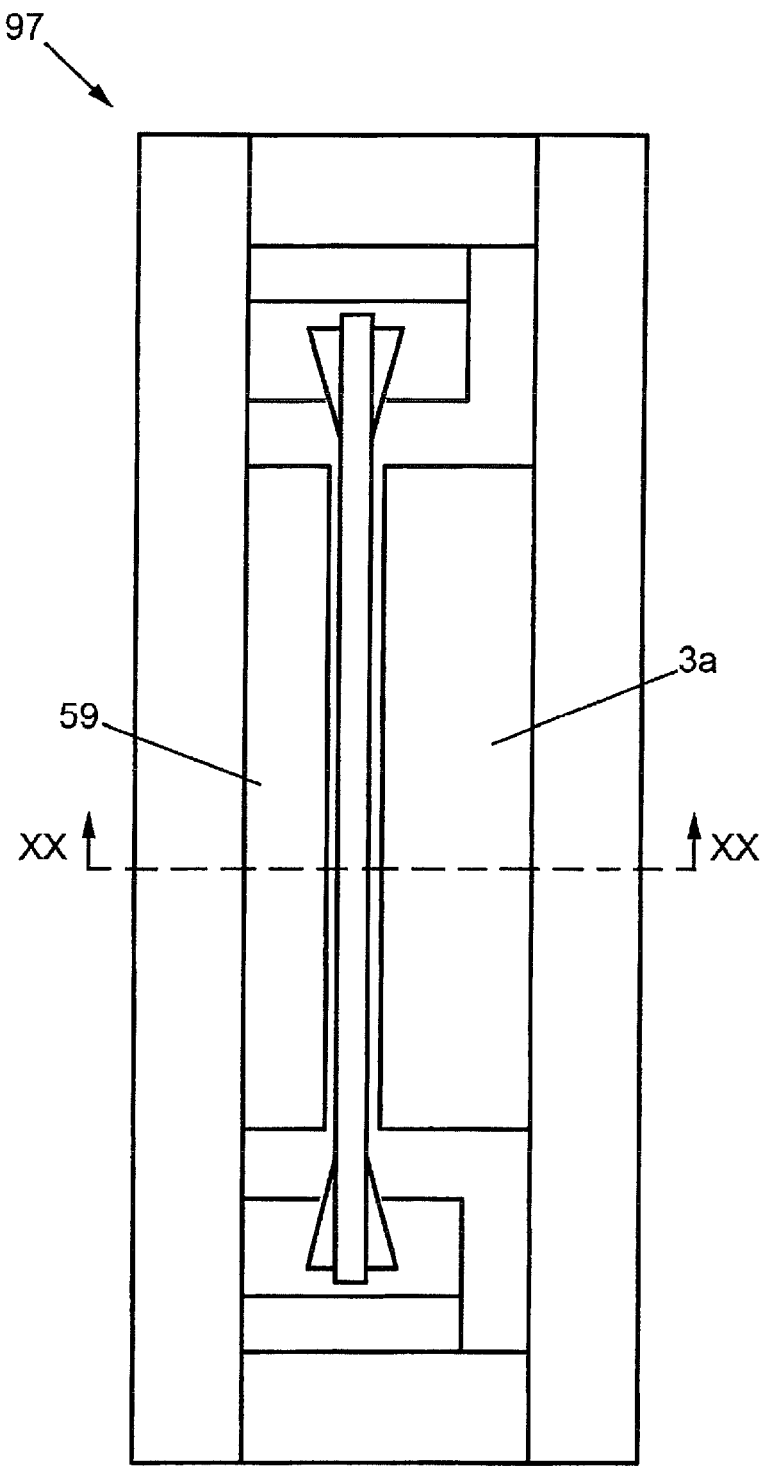
FIG. 19 is a schematic representation of an alternative form of the elemental machine of FIGS. 1 to 10, forming a further embodiment of the invention.

FIG. 19 is a schematic representation of an alternative form of the elemental machine of FIGS. 1 to 10, in which the spatially-periodic magnetic array 3 of paired magnetic force units 25 is replaced by a single spatially-periodic array 3a forming the first portion of the magnetic part, facing an plate 59 of magnetic material on the opposite side of the air gap forming the second portion of the magnetic part. The magnetic material from which the plate is made in this embodiment is iron and other magnetic materials may be used. It will be understood that the magnetic material of the second portion is induced to form a spatially periodic array of magnetic poles of complementary polarity, so that the conductors continue to be placed in transverse spatially-periodic fields. The construction is simpler in form, but because the air gap is only half as wide for the same size magnets, the motor 97 is less powerful and the power-to-weight ratio is reduced. Nevertheless, the construction might be advantageous for some applications. An elemental motor of the type shown in FIG. 19 could be used to replace the elemental motor of FIGS. 1 to 10 in any of the above described concatenated motor systems, although the performance would be consequently reduced.

Figure 20:
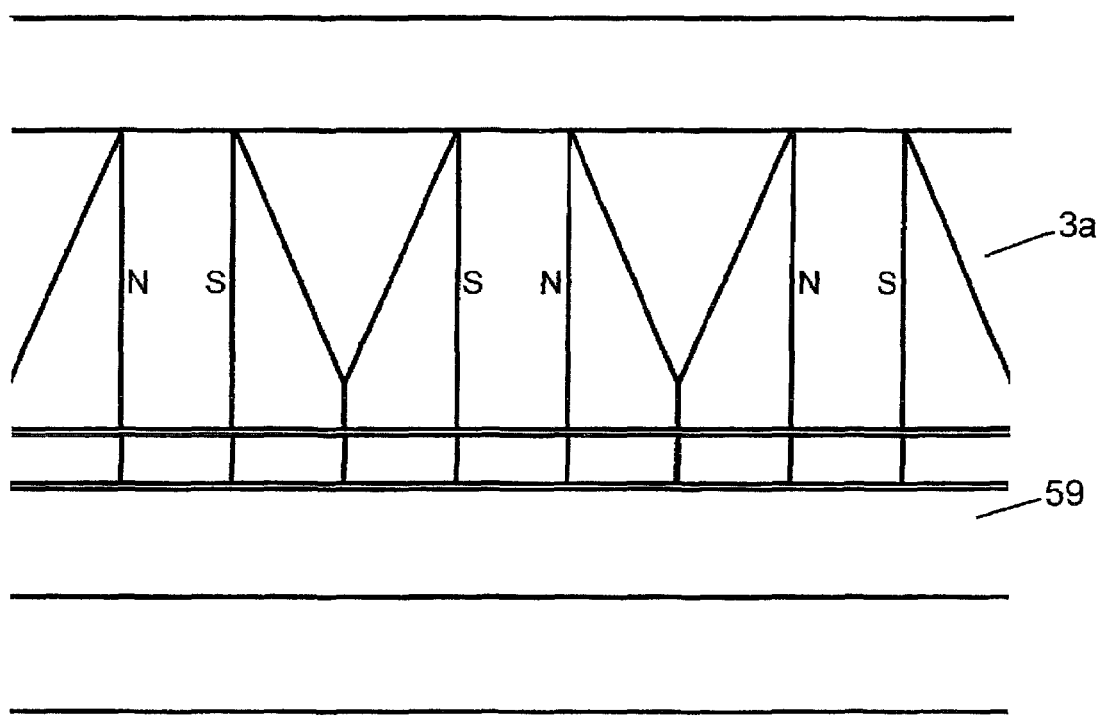
FIG. 20 is a cross section view through line XX-XX of FIG. 19.

FIG. 20 is a cross section view through line XX-XX of FIG. 19 showing a simplified schematic representation of the alternative design, being equivalent to that of FIG. 3, with the same nomenclature for its components. The iron plate 59 replaces one of the paired axially-periodic magnet arrays 3 and creates induced magnetic poles of complementary polarity.

Various modifications will be apparent to those in the art and it is desired to include all such modifications as fall within the scope of the accompanying claims.

It will be understood that the principles of this invention may be extended to include machines that use different configurations of magnets to produce spatially periodic magnetic fields across the gap between the first and second portions of the magnetic part and that electromagnets may be used in place of the permanent magnets previously considered.

It may also be extended to include induction machines wherein the array of permanent magnets is replaced by a passive arrangement of patterned conductive laminations. In such induction machines a travelling magnetic field is produced by phased alternating currents in the powered conductors and eddy currents are deliberately arranged to flow in the passive conductor array. The interaction of the induced currents and the controlled alternating currents produces an axial force. Although the resulting axial force is smaller than that produced by a machine using permanent magnets or using fields produced by electromagnets, an induction machine is low in cost and light in weight and it may offer a significant advantage in some circumstances.

It will also be understood that the principles of this invention may be extended to include a concatenation of wireless linear machines of any alternative design that have parallel force vectors in a manner equivalent to that shown in FIG. 14, so as to increase the force per unit length of actuator and to share common structural members so as to reduce cost and weight.

It will be further understood that the principles of this invention may be extended to include conducting vanes of iron or steel. In that case there will be a strong magnetostatic force between the armature and the stator and the machine losses will be greater than those for a machine with (e.g.) aluminium conductors. Nevertheless, there may be a significant benefit because the reluctance of the air gap will be considerably reduced, so that less magnetic material will be needed for the construction of the periodic magnetic arrays 26.

The principles of the invention may be further extended to include a conducting material that consists in or is coated with a layer of superconducting material, with the advantage that resistive losses may be entirely eliminated and that much higher current densities can be used to produce a large force in a small space.

Electromagnetic machines forming embodiments of the invention as described herein benefit form one or more of the following advantages:

1. The mass of the electrical part of any electrical machine may be reduced by the replacement of copper wire by patterned laminar aluminium conductors;
2. The manufacturing cost may be reduced by shaping the cross section of the patterned conductor laminations and bonding them into a robust, self-supporting mechanical structure,
3. The insulation of the aluminium conductors by an anodising process is simple and provides a robust insulating coating that will withstand high temperature operation if necessary;
4. The mass of the machine may be further reduced by the elimination of backing iron for the electrical conductors, which also eliminates the "iron loss";
5. Because the conductor assembly is lightweight, robust and dimensionally stable, it may, in some applications, be used as an armature of exceptionally-low inertia, thus increasing the operating bandwidth in control applications;
6. Although the magnetic field strengths are high, there is no magnetostatic attraction between the armature and the stator. This makes the machine easier and safer to assemble and it reduces bearing forces and bearing wear;
7. The same technique allows the electrical system to be manufactured and transported in sections, so that a large motor may be assembled on site without undue difficulty;
8. The electrical system of the motor is less costly than any copper wire equivalent and it may sometimes be advantageous for a long-travel linear motor to use an electrical stator;
9. A long (perhaps circuitous) electrical stator may then be built from isolated sections that are powered independently, so that several permanent magnet armatures may be moved precisely and independently on the same stator;
10. Because the elemental machine is planar in form, the locus of motion of a linear machine may follow any smooth path in three dimensions, whilst rotating on its own axis if required;
11. A high-torque rotary motor can be constructed in disc or drum topology by using a circular electrical vane, moving between or relative to paired periodic arrays of magnetic poles;
12. A number of elemental linear electric motors may be concatenated to form a larger machine, in which process the construction of the elemental motors may be simplified to reduce size, weight and cost and to balance the internal magnetostatic forces;
13. In the same way a number of elemental rotary motors may be combined to form a rotary motor of exceptional torque, in which process the internal structure can also be simplified to reduce size, weight and cost;
14. If the concatenation of elemental linear motors forms a complete circle, the end effects are eliminated and the magnetostatic forces are balanced throughout the structure;
15. Using the aforementioned technique, a number of elemental linear motors can be housed within a compact cylindrical volume, the exceptionally large output thrust being conveyed via a rod or tube;
16. The rod or tube output of such a machine may be sealed to act as the output element of a gas spring subsystem that supports a deadload whilst the electromagnetic system provides the dynamic forces;
17. Such a sealed machine may also function as a fluid pump or as a mechanism by which fluid energy may be efficiently converted to electrical energy, the wireless motor being driven in reverse; and
18. The technology is fully scaleable and may be applied to electromagnetic machines having a wide range of sizes and power outputs.

The invention claimed is:
1. An electromagnetic machine comprising:
a magnetic part having a first portion and a second portion disposed in spaced relationship to the first portion, the magnetic part being arranged to provide a regular spatially periodic magnetic field across an air gap between the first portion and the second portion; and
an electrical part disposed in the air gap between the first and second portions of the magnetic part and arranged to move relative to the magnetic part, the electrical part comprising a set of insulated patterned laminar conductors which intercept the spatially periodic magnetic field, the set of insulated laminar conductors being patterned to form transverse conducting paths lying perpendicular to both the magnetic field and the direction of relative motion of the electrical and magnetic parts, the transverse conducting paths being connected at their ends by axial conducting paths, the insulated patterned laminar conductors being arranged to form a plurality of phases through which separate electrical currents are arranged to pass, the relative signs and amplitudes of the currents being controlled so as to determine the magnitude and sign of the electromagnetic force produced by the machine; wherein the transverse conducting paths each have a dimension along or parallel to the direction of relative motion that is approximately equal to but less than one sixth of the length of the magnetic period of the spatially periodic magnetic field, the axial conducting paths being arranged to cause the current in the conductors to flow alternately back and forth transverse to the direction of relative motion with a spatial period equal to one half of the magnetic period, the transverse conducting paths of the phases being interdigitated in the region of the spatially-periodic magnetic field and the axial conducting paths overlapping one another outside the region of the spatially-periodic magnetic field.

2. An electromagnetic machine according to claim 1, wherein the set of insulated patterned laminar conductors forms a self-supporting structure.

3. An electromagnetic machine according to claim 1, wherein one or both of the first and second portions of the magnetic part comprises a regular array of magnets made of a permanently magnetised material.

4. An electromagnetic machine according to claim 3, wherein the magnets are planar magnets having opposed poles on their planar faces which face the direction of relative motion of the electrical and magnetic parts, the magnetic array further comprising pole pieces mounted on the planar faces of the magnets, each pole piece being shaped to turn and concentrate the magnetic flux generated by the magnets so that it emerges from a face of the pole piece which is substantially parallel to the patterned laminar conductors at an increased flux density to cross the air gap between the first and second portions of the magnetic part.

5. An electromagnetic machine according to claim 4, in which the pole pieces are shaped so as to discourage flux leakage.

6. An electromagnetic machine according to claim 4, wherein the axial dimension of each transverse conductor of the set of patterned laminar conductors within the magnetic field between the first and second portions of the magnetic part is substantially equal to, or is a coarse fraction of, the axial dimension of a pole piece.

7. An electromagnetic machine according to claim 1, wherein the set of insulated patterned laminar conductors forms one of a flat planar mechanical structure, a curved mechanical structure and a circular mechanical structure.

8. An electromagnetic machine according to claim 1, wherein at least one portion of the set of patterned laminar conductors is articulated or flexible.

9. An electromagnetic machine according to claim 1, wherein at least one of the patterned insulated laminar conductors is made of a ferromagnetic material.

10. An electromagnetic machine according to claim 1, wherein the second portion of the magnetic part comprises a plate of ferromagnetic material.

11. An electromagnetic machine according to claim 1, wherein the spatially-periodic magnetic field is produced by means of wire coils or insulated patterned laminar conductors through which electric currents are caused to flow when the machine is in operation.

12. An electromagnetic machine according to claim 1, wherein the spatially-periodic magnetic field is induced by temporal variation of the currents in the conductors of the electrical part.

13. An electromagnetic machine according to claim 1, in which either the magnetic part forms an armature and the electrical part forms a stator or the magnetic part forms the stator and the electrical part forms an armature, wherein the armature is arranged to rotate or move axially within the stator assembly whilst being supported by means of at least one bearing assembly.

14. An electromagnetic machine according to claim 1, wherein the electrical part is divided into sectors along the locus of relative motion of the electrical and magnetic parts, each of the sectors being independently powered and controlled so as to provide independent control of a plurality of magnetic parts sharing the sectors of the electrical part.

15. An electromagnetic machine according to claim 1, wherein at least one of the insulated patterned laminar conductors includes or supports a layer of material which, when cooled below its critical temperature, becomes superconducting.

16. An electromagnetic machine according to claim 1, wherein the electrical part is cylindrical, the transverse conducting paths being provided axially, and the magnetic part is arranged to provide the spatially periodic magnetic field through the cylindrical electrical part such that when current flows in the transverse conductor paths an electromagnetic force is induced to cause rotary movement of the electrical part relative to the magnetic part about the axis of the cylinder.

17. An electromagnetic machine according to claim 1, wherein the electrical part is disc-shaped, the transverse conducting paths being provided radially, and the magnetic part is arranged to provide the spatially periodic magnetic field through the radial conducting paths such that when current flows in the radial conducting paths an electromagnetic force is induced to cause rotation of the electric part relative to the magnetic part about the centre of the disc.

18. An rotary electromagnetic machine comprising a plurality of electromagnetic machines, each electromagnetic machine comprising:

a magnetic part having a first portion and a second portion disposed in spaced relationship to the first portion, the magnetic part being arranged to provide a regular spatially periodic magnetic field across an air gap between the first portion and the second portion; and an electrical part disposed in the air gap between the first and second portions of the magnetic part and arranged to move relative to the magnetic part, the electrical part comprising a set of insulated patterned laminar conductors which intercept the spatially periodic magnetic field, the set of insulated laminar conductors being patterned to form transverse conducting paths lying perpendicular to both the magnetic field and the direction of relative motion of the electrical and magnetic parts, the transverse conducting paths being connected at their ends by axial conducting paths, the insulated patterned laminar conductors being arranged to form a plurality of phases through which separate electrical currents are arranged to pass, the relative signs and amplitudes of the currents being controlled so as to determine the magnitude and sign of the electromagnetic force produced by the machine; wherein the transverse conducting paths each have a dimension along or parallel to the direction of relative motion that is approximately equal to but less than one sixth of the length of the magnetic period of the spatially periodic magnetic field, the axial conducting paths being arranged to cause the current in the conductors to flow alternately back and forth transverse to the direction of relative motion with a spatial period equal to one half of the magnetic period, the transverse conducting paths of the phases being interdigitated in the region of the spatially-periodic magnetic field and the axial conducting paths overlapping one another outside the region of the spatially-periodic magnetic field, wherein the electrical part is disc-shaped, the transverse conducting paths being provided radially, and the magnetic part is arranged to provide the spatially periodic magnetic field through the radial conducting paths such that when current flows in the radial conducting paths an electromagnetic force is induced to cause rotation of the electric part relative to the magnetic part about the centre of the disc, the disc-shaped electrical parts of the plurality of electromagnetic machines having a common axis, the electrical parts or the magnetic parts being coupled to a central shaft provided at the common axis such that when current flows in the disc-shaped electrical parts and electromagnetic force is induced to cause rotation of the electrical parts relative to the magnetic parts to drive rotation of the central shaft.

19. A linear electromagnetic machine comprising a plurality of electromagnetic machines, each electromagnetic machine comprising:

a magnetic part having a first portion and a second portion disposed in spaced relationship to the first portion, the magnetic part being arranged to provide a regular spatially periodic magnetic field across an air gap between the first portion and the second portion; and an electrical part disposed in the air gap between the first and second portions of the magnetic part and arranged to move relative to the magnetic part, the electrical part comprising a set of insulated patterned laminar conductors which intercept the spatially periodic magnetic field, the set of insulated laminar conductors being patterned to form transverse conducting paths lying perpendicular to both the magnetic field and the direction of relative motion of the electrical and magnetic parts, the transverse conducting paths being connected at their ends by axial conducting paths, the insulated patterned laminar conductors being arranged to form a plurality of phases through which separate electrical currents are arranged to pass, the relative signs and amplitudes of the currents being controlled so as to determine the magnitude and sign of the electromagnetic force produced by the machine; wherein the transverse conducting paths each have a dimension along or parallel to the direction of relative motion that is approximately equal to but less than one sixth of the length of the magnetic period of the spatially periodic magnetic field, the axial conducting paths being arranged to cause the current in the conductors to flow alternately back and forth transverse to the direction of relative motion with a spatial period equal to one half of the magnetic period, the transverse conducting paths of the phases being interdigitated in the region of the spatially-periodic magnetic field and the axial conducting paths overlapping one another outside the region of the spatially-periodic magnetic field, the electrical and magnetic parts of each electromagnetic machine being disposed radially around a central shaft, the electrical parts being arranged to move relative to respective magnetic parts in a direction parallel to the axis of the central shaft.

20. A linear electromagnetic machine according to claim 19, wherein at least one of the electrical parts has an associated magnetic array in common with at least one of its neighbouring electrical parts.

21. A linear electromagnetic machine according to claim 20, comprising a cylindrical container in which the electrical and magnetic parts are provided, wherein at least one end of the containing cylinder has an aperture and carries a bearing through which a thrust tube or rod emerges so as to convey the induced electromagnetic force to an external load.

22. A linear electromagnetic machine according to claim 21, wherein the containing cylinder is hermetically sealed and the emerging thrust rod or tube is arranged to pass through a sliding seal to provide both an electrical and pneumatic function.

23. A linear electromagnetic machine according to claim 22, wherein the thrust rod or tube forms the active element of a gas spring.

24. A linear electromagnetic machine according to claim 21, wherein the movement of the electrical part is arranged to propel or to be propelled by fluid within the enclosed cylinder, so as to function as a pump or to absorb energy from a moving fluid.

25. A linear electromagnetic machine according to claim 19, wherein the electrical part is divided into electrically-isolated sectors along the locus of motion of the machine.

* * * * *